US011871492B2

(12) United States Patent
Takahashi et al.

(10) Patent No.: US 11,871,492 B2
(45) Date of Patent: Jan. 9, 2024

(54) LIGHT EMITTING ELEMENT DRIVE DEVICE AND LIGHT EMITTING SYSTEM

(71) Applicant: Rohm Co., Ltd., Kyoto (JP)

(72) Inventors: Toru Takahashi, Kyoto (JP); Masaaki Nakayama, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 17/910,148

(22) PCT Filed: Sep. 29, 2020

(86) PCT No.: PCT/JP2020/037020
§ 371 (c)(1),
(2) Date: Sep. 8, 2022

(87) PCT Pub. No.: WO2021/181733
PCT Pub. Date: Sep. 16, 2021

(65) Prior Publication Data
US 2023/0099245 A1    Mar. 30, 2023

(30) Foreign Application Priority Data

Mar. 12, 2020  (JP) .................................. 2020-043069

(51) Int. Cl.
H05B 45/37    (2020.01)
H05B 45/397   (2020.01)
(52) U.S. Cl.
CPC .................. H05B 45/397 (2020.01)
(58) Field of Classification Search
CPC ...... H05B 45/37; H05B 45/38; H05B 45/325; H05B 45/395; H05B 45/397; H05B 45/3725
See application file for complete search history.

(56) References Cited

U.S. PATENT DOCUMENTS 11,172,558  B2*  11/2021  Qiu .................... H05B 45/40
2010/0201283 A1*  8/2010  Kawata ............. H05B 45/3725
                                                    315/287
(Continued)

FOREIGN PATENT DOCUMENTS

JP    2010182883    8/2010
JP    2012114316    6/2012
JP    2019071211    5/2019

OTHER PUBLICATIONS

International Search Report in International Appln. No. PCT/JP2020/037020, dated Dec. 1, 2020, 5 pages (with English Translation).

Primary Examiner — Tung X Le
(74) Attorney, Agent, or Firm — Fish & Richardson P.C.

(57) ABSTRACT

A light emitting element drive device includes a driving circuit that supplies a variable drive current to a light emitting unit having one or more light emitting elements so that the light emitting unit can emit light, a drive reference voltage generation circuit that generates a drive reference voltage defining the upper limit value of the drive current and supplies the same to the driving circuit, and a specific external terminal capable of connecting to an external resistor. The drive reference voltage generation circuit operates selectively in a first mode to generate the drive reference voltage regardless of the state of the specific external terminal, or a second mode to generate the drive reference voltage in accordance with a second mode current through the specific external terminal.

20 Claims, 12 Drawing Sheets

(56) References Cited

U.S. PATENT DOCUMENTS

2018/0338364 A1* 11/2018 Ido .................. H05B 45/10
2019/0097533 A1* 3/2019 Kawata ............. H05B 47/25

* cited by examiner

LIGHT EMITTING ELEMENT DRIVE DEVICE AND LIGHT EMITTING SYSTEM

TECHNICAL FIELD

The present disclosure relates to a light emitting element drive device and a light emitting system.

BACKGROUND ART

An LED driver drives a light emitting unit constituted of LEDs. The LED driver is typically an electronic component formed by sealing a semiconductor integrated circuit in a case (package) made of resin, and has a plurality of external terminals exposed from the case of the LED driver.

LIST OF CITATIONS

Patent Literature

Patent Document 1: JP-A-2010-182883

SUMMARY OF THE DISCLOSURE

Technical Problem

FIG. 13 illustrates an LED driver 910 according to a first reference structure, and FIG. 14 illustrates an LED driver 920 according to a second reference structure. Each of the LED drivers 910 and 920 has a plurality of channels of light emitting unit connection terminals to be connected to light emitting units 950, and supplies desired drive current to the light emitting unit 950 of each channel. A driving circuit 911 of each channel in the LED driver 910 as well as a driving circuit 921 of each channel in the LED driver 920 drives the corresponding light emitting unit 950 by PWM drive or DC drive. In the driving circuit 911 or 921, the drive current can be varied by adjusting resistance of a variable resistor in the driving circuit within a predetermined adjustment range, on the basis of a dimming control signal $S_{DIMMING}$. In this case, the upper limit value of the drive current is determined depending on a drive reference voltage $V_{DREF}'$.

In the LED driver 910 of FIG. 13, the drive reference voltage $V_{DREF}'$ (therefore the upper limit value of the drive current) is set based on an external resistor Ra connected externally to the LED driver 910. In the LED driver 920 of FIG. 14, the drive reference voltage $V_{DREF}'$ (therefore the upper limit value of the drive current) is set based on an internal resistor Rb included in the LED driver 920.

It is expected that the setting accuracy of the upper limit value of the drive current when using the external resistor Ra is higher than that when using the internal resistor Rb, but necessity of the external resistor Ra causes increase in the number of components of the whole system. Therefore, the LED driver 920 that does not require the external resistor Ra is preferred in many cases.

On the other hand, depending on a system that incorporates the LED driver 920, it may be requested to increase the upper limit value of the drive current. In other words, in the LED driver 920 of FIG. 14, in accordance with characteristics or the like of the light emitting unit 950 to be connected to the light emitting unit connection terminal, the upper limit value of the drive current is set in advance to a first upper limit value (e.g. 60 mA), but depending on a system that incorporates the LED driver 920, it is requested to increase the upper limit value of the drive current to a second upper limit value (first upper limit value<second upper limit value). However, the LED driver 920 cannot change the drive reference voltage $V_{DREF}'$ determined in the design stage, and hence cannot satisfy the request.

By using the LED driver 910 of FIG. 13, the request can be satisfied. However, if the LED driver 910 is used, the external resistor Ra is essential also for the system in which the first upper limit value is sufficient as the upper limit value of the drive current.

It is considered to prepare the LED driver 910 and the LED driver 920 separately, to use the LED driver 920 for the system in which the first upper limit value is sufficient as the upper limit value of the drive current, and to use the LED driver 910 for the system in which the upper limit value of the drive current is requested to increase from the first upper limit value. However, this requires to design and manufacture both the LED drivers 910 and 920, and is not versatile.

Note that in the above description, the LEDs are exemplified as the light emitting elements constituting the light emitting unit, and the LED driver is exemplified as the light emitting element drive device, for describing the circumstances related to the light emitting element drive device. However, there are the same circumstances in the other light emitting element drive devices handling light emitting elements other than LEDs.

It is an object of the present disclosure to provide a light emitting element drive device and a light emitting system having high versatility in the upper limit of the drive current.

Means for Solving the Problem

A light emitting element drive device according to the present disclosure includes a driving circuit configured to supply a variable drive current to a light emitting unit having one or more light emitting elements, so that the light emitting unit can emit light; a drive reference voltage generation circuit configured to generate a drive reference voltage defining an upper limit value of the drive current, and supply the same to the driving circuit; and a specific external terminal, in which the drive reference voltage generation circuit operates selectively in a first mode to generate the drive reference voltage regardless of the state of the specific external terminal, or a second mode to generate the drive reference voltage in accordance with a second mode current through the specific external terminal (first structure).

The light emitting element drive device of the first structure described above may have a structure in which an external resistor is connected or not between the specific external terminal and ground, outside the light emitting element drive device (second structure).

The light emitting element drive device of the second structure described above may have a structure in which when the drive reference voltage generation circuit operates in the second mode in a state where the external resistor is connected between the specific external terminal and the ground, the drive reference voltage generation circuit supplies the second mode current to the external resistor through the specific external terminal, so as to generate the drive reference voltage in accordance with the magnitude of the second mode current or the voltage generated by the external resistor (third structure).

The light emitting element drive device of the third structure described above may have a structure in which when the drive reference voltage generation circuit operates in the second mode in the state where the external resistor is connected between the specific external terminal and the ground, the drive reference voltage is higher than that in the first mode, depending on the resistance value of the external resistor, and the driving circuit increases the upper limit value of the drive current along with increase in the drive reference voltage (fourth structure).

The light emitting element drive device of any one of the first to fourth structures described above may have a structure in which the drive reference voltage generation circuit includes a reference current generation circuit configured to generate a reference current commonly in the first mode and in the second mode, a current superimposing circuit configured to generate the second mode current only in the second mode out of the first and second modes, and a current mirror circuit configured to generate an output side current proportional to an input side current, so as to generate the drive reference voltage in proportion to the output side current, and in the first mode the input side current is equal to the reference current, while in the second mode the input side current is equal to the reference current plus the second mode current (fifth structure).

The light emitting element drive device of the fifth structure described above may have a structure in which the drive reference voltage generation circuit includes a switch inserted in series between an input terminal of the current mirror circuit and the specific external terminal, the light emitting element drive device further includes a switch control circuit configured to control the switch, and in the first mode the switch control circuit turns off the switch, while in the second mode it turns on the switch so as to superimpose the second mode current flowing through the specific external terminal on the input side current (sixth structure).

The light emitting element drive device of the sixth structure described above may have a structure further including an abnormality detection circuit configured to detect whether or not the second mode current has an abnormality, on the basis of the magnitude of the second mode current flowing through the specific external terminal in the second mode, in which if the abnormality detection circuit does not detect an abnormality in the second mode, the switch control circuit keeps turning on the switch, and if the abnormality detection circuit detects an abnormality in the second mode, the switch control circuit switches the switch from on to off, so that the operation mode of the drive reference voltage generation circuit is changed from the second mode to the first mode (seventh structure).

The light emitting element drive device of any one of the first to fourth structures described above may have a structure in which the drive reference voltage generation circuit includes a current generation circuit configured to generate a predetermined current, and an internal resistor, and in the first mode the drive reference voltage generation circuit supplies the predetermined current to the internal resistor, so as to supply a voltage generated by the internal resistor as the drive reference voltage to the driving circuit, while in the second mode the drive reference voltage generation circuit supplies the predetermined current as the second mode current to the specific external terminal, so as to supply a voltage generated at the specific external terminal as the drive reference voltage to the driving circuit (eighth structure).

The light emitting element drive device of the eighth structure described above may have a structure in which the drive reference voltage generation circuit includes a first switch inserted in series between an output terminal of the current generation circuit and the internal resistor, and a second switch inserted in series between the output terminal of the current generation circuit and the specific external terminal, the light emitting element drive device further includes a switch control circuit configured to control the first switch and the second switch, and in the first mode the switch control circuit turns on the first switch and turns off the second switch, so that the predetermined current is supplied to the internal resistor, while in the second mode the switch control circuit turns off the first switch and turns on the second switch, so that the predetermined current is supplied as the second mode current to the specific external terminal (ninth structure).

The light emitting element drive device of the ninth structure described above may have a structure further including an abnormality detection circuit configured to detect whether or not the drive reference voltage has an abnormality, on the basis of a voltage at the specific external terminal in the second mode, in which if the abnormality detection circuit does not detect an abnormality in the second mode, the switch control circuit keeps turning off the first switch and keeps turning on the second switch, and if the abnormality detection circuit detects an abnormality in the second mode, the switch control circuit switches the first switch from off to on and switches the second switch from on to off, so that the operation mode of the drive reference voltage generation circuit is changed from the second mode to the first mode (tenth structure).

The light emitting element drive device of any one of the first to tenth structures described above may have a structure in which the driving circuit is disposed for each of a plurality of channels, and the drive reference voltage generation circuit generates the drive reference voltage for each channel (eleventh structure).

A light emitting system according to the present disclosure includes the light emitting element drive device of any one of the first to eleventh structures described above, and a light emitting unit to be driven and controlled by the light emitting element drive device (twelfth structure).

Advantageous Effects of the Disclosure

According to the present disclosure, it is possible to provide a light emitting element drive device and a light emitting system having high versatility in the upper limit of the drive current.

DESCRIPTION OF EMBODIMENTS

Figure 1:
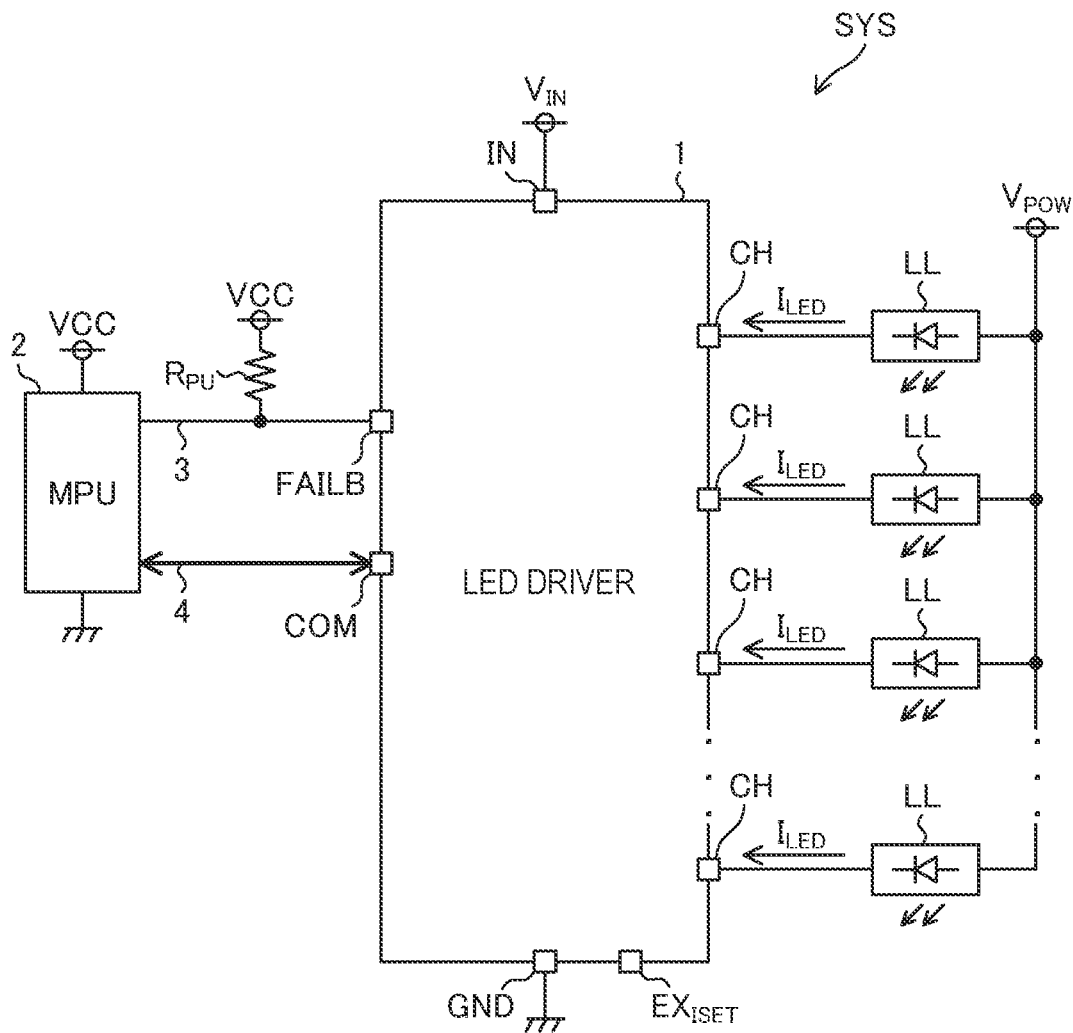
FIG. 1 is an overall configuration diagram of a light emitting system according to an embodiment of the present disclosure.

Hereinafter, an example of an embodiment of the present disclosure is described specifically with reference to the drawings. In the drawings to be referred to, the same part is denoted by the same numeral or symbol, and overlapping description of the same part is omitted as a rule. Note that in this specification, for simple description, a name of information, a signal, a physical quantity, an element, a part, or the like may be omitted or shortened by referring to a numeral or symbol representing the same. For instance, a drive reference voltage generation circuit denoted by 20A (see FIG. 7) described later may be referred to as a drive reference voltage generation circuit 20A or shortened as a circuit 20A, which indicate the same thing.

First, some terms used for description of the embodiments of the present disclosure are defined below. A ground means a reference conductive part having a potential of 0 V (zero volts) to be a reference, or means the potential of 0 V itself. The reference conductive part is made of a conductor such as metal. The potential of 0 V may be referred to as a ground potential. In the embodiment of the present disclosure, a voltage without a specific reference means a potential from the ground. A level means a potential level, and high level has a higher potential than low level of any signal or voltage. For any signal or voltage, if the signal or voltage is at high level, it means that a level of the signal or voltage is at high level, and if the signal or voltage is at low level, it means that a level of the signal or voltage is at low level. A level of a signal may be referred to as a signal level, and a level of a voltage may be referred to as a voltage level. For any signal that can have a signal level at high level or low level, a period during which the signal level is at high level is referred to as a high level period, and a period during which the signal level is at low level is referred to as a low level period. The same is true for any voltage that can have a voltage level at high level or low level.

For any transistor constituted as a field effect transistor (FET) including a MOSFET, an ON state means a state where the transistor is conducting between drain and source, while an OFF state means a state where the transistor is not conducting between drain and source (a cutoff state). The same is true for other transistors that are not classified into the FET. The MOSFET is understood as an enhancement type MOSFET unless otherwise noted. The MOSFET is abbreviation of metal-oxide-semiconductor field-effect transistor.

Any switch can be constituted using one or more field effect transistors (FETs). If a switch is in the ON state, the switch is conducting between its terminals. If a switch is in the OFF state, the switch is not conducting between its terminals. In the following description, for any transistor or switch, the ON state and the OFF state may be simply referred to as ON and OFF, respectively.

FIG. 1 is an overall configuration diagram of a light emitting system SYS according to the embodiment of the present disclosure. The light emitting system SYS includes an LED driver 1 as an example of an light emitting element drive device, a micro processing unit (MPU) 2 that controls the LED driver 1, and n channels of light emitting units LL driven and controlled by the LED driver 1. Here, n is any integer more than one (e.g. 24). It may be possible that n is 1, but it is supposed that n≥2 is satisfied in the following description unless otherwise noted. In addition, a pull-up resistor $R_{PU}$ and wirings 3 and 4 are also included as components of the light emitting system SYS.

Each of the light emitting units LL is constituted of one or more light emitting diodes (LEDs). For instance, the light emitting unit LL is constituted of a plurality of LEDs connected in series. However, the light emitting unit LL may be a plurality of LEDs connected in parallel. Further, connections in series and in parallel of a plurality of LEDs may be mixed in the single light emitting unit LL. It may be possible that a single LED constitute the single light emitting unit LL. Each of the light emitting units LL has a high potential terminal and a low potential terminal, and each LED constituting the light emitting unit LL has a forward direction from the high potential terminal to the low potential terminal.

The LED driver 1 has n terminals CH. Each terminal CH is a light emitting unit connection terminal to be connected to the light emitting unit LL. The high potential terminal of each light emitting unit LL is applied with a power supply voltage $V_{POW}$ that is a positive DC voltage, and the low potential terminal of each light emitting unit LL is connected to the corresponding terminal CH. A current flowing in each light emitting unit LL is referred to as a drive current $I_{LED}$.

Figure 2:
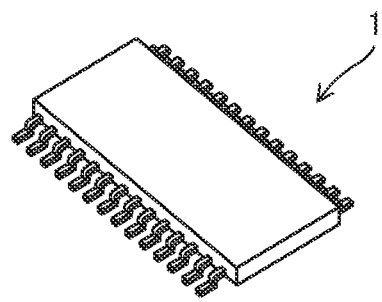
FIG. 2 is an appearance perspective view of an LED driver according to the embodiment of the present disclosure.

The LED driver 1 is an electronic component (semiconductor device) formed by sealing a semiconductor integrated circuit in a case (package) as illustrated in FIG. 2. A plurality of external terminals are exposed from the case of the LED driver 1. In the LED driver 1 according to the structural example of FIG. 1, the plurality of external terminals include terminals IN, GND, $EX_{ISET}$, FAILB, and COM, and the n terminals CH as illustrated in FIG. 1. Other terminals may be included in the plurality of external terminals. Note that the number of external terminals of the LED driver 1 and an appearance of the LED driver 1 illustrated in FIG. 2 are merely examples.

An input voltage $V_{IN}$ is supplied to the terminal IN from outside of the LED driver 1. The input voltage $V_{IN}$ is supposed to be a positive DC voltage. The LED driver 1 is driven based on the input voltage $V_{IN}$. The terminal GND is connected to the ground. The terminal FAILB is connected to the MPU 2 via the wiring 3. The MPU 2 operates based on a power supply voltage VCC that is a predetermined positive DC voltage. The wiring 3 that connects the terminal FAILB and the MPU 2 is connected to an application terminal of the power supply voltage VCC (a terminal applied with the power supply voltage VCC) via the pull-up resistor $R_{PU}$. In addition, the MPU 2 is connected to the terminal COM as a communication terminal via the communication wiring 4. The LED driver 1 and the MPU 2 can communicate with each other in a bidirectional manner via the communication wiring 4. Although FIG. 1 illustrates only one terminal COM, but in reality the terminal COM is constituted of a plurality of external terminals, and correspondingly the communication wiring 4 is constituted of a plurality of wirings. Any communication method can be used between the LED driver 1 and the MPU 2. For instance, a method conforming to a serial peripheral interface (SPI) can be used. The terminal $EX_{ISET}$ will be described later.

Figure 3:
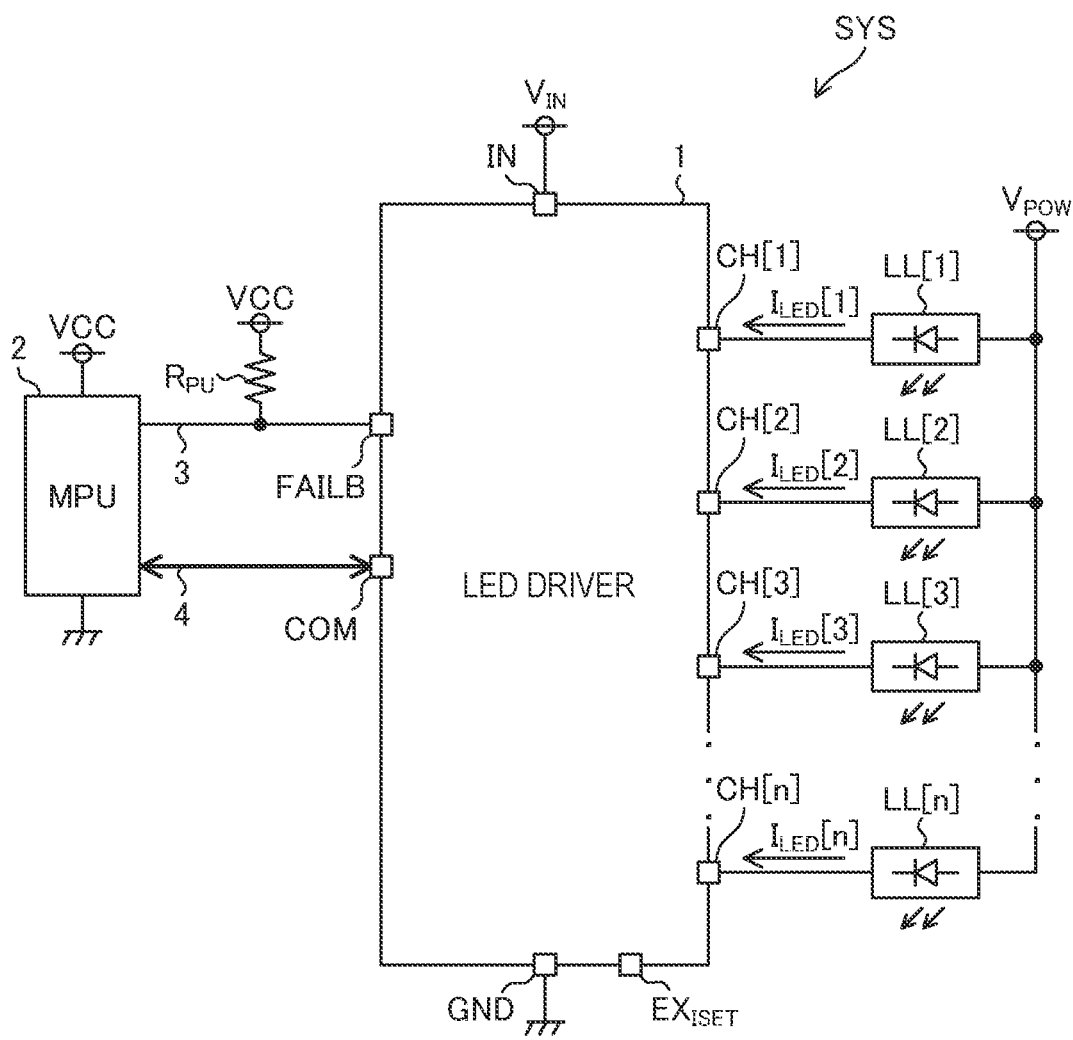
FIG. 3 is an overall configuration diagram of the light emitting system according to the embodiment of the present disclosure.

With reference to FIG. 3, in the following description, if then terminals CH (i.e. the n channels of terminals CH) should be distinguished from each other, the n terminals CH are referred to as terminals CH[1] to CH[n]. In the same manner, if the n light emitting units LL (e.g. the n channels of light emitting units LL) should be distinguished from each other, the n light emitting units LL are referred to as light emitting units LL[1] to LL[n], and the drive current $I_{LED}$ flowing in the light emitting unit LL[i] is particularly referred to as a drive current $I_{LED}[i]$. Here, i represents any integer. The terminals CH of the first to n-th channels are the terminals CH[1] to CH[n], respectively, and the light emitting units LL of the first to n-th channels are the light emitting units LL[1] to LL[n], respectively. The high potential terminals of the light emitting units LL[1] to LL[n] are connected to an application terminal of the power supply voltage $V_{POW}$ (a terminal applied with the power supply voltage $V_{POW}$), and low potential terminals of the light emitting units LL[1] to LL[n] are connected to the terminals CH[1] to CH[n], respectively. Therefore, the drive currents $I_{LED}[1]$ to $I_{LED}[n]$ flow through the terminals CH[1] to CH[n], respectively.

Note that the LED driver 1 may have a DC/DC converter function of generating the power supply voltage $V_{POW}$ from the input voltage $V_{IN}$. The DC/DC converter may control the voltage value of the power supply voltage $V_{POW}$ based on voltages at the terminals CH[1] to CH[n], for example. The circuit that generates the power supply voltage $V_{POW}$ may be another circuit disposed separately from the LED driver 1.

Figure 4:
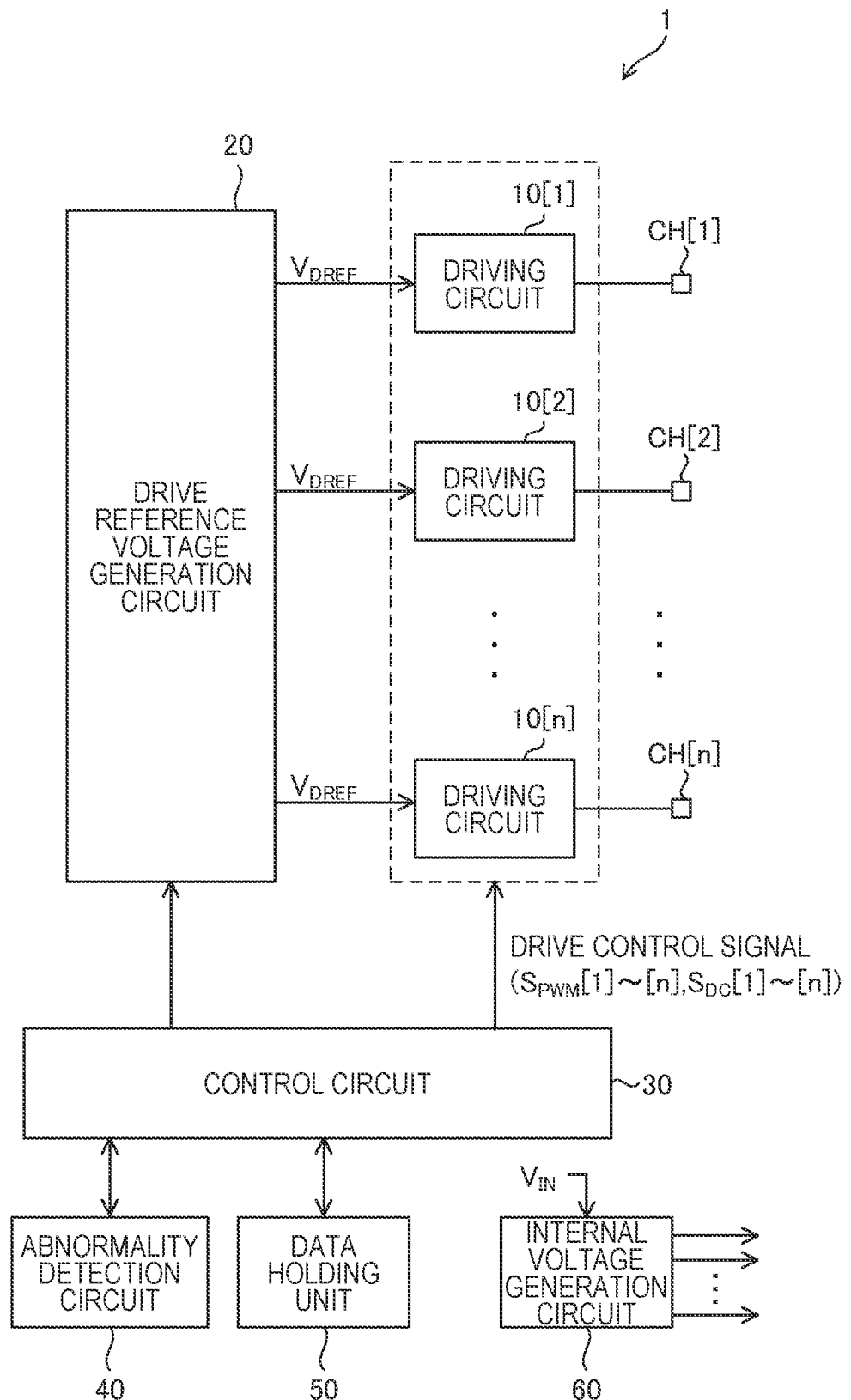
FIG. 4 is an internal block diagram of a main part of the LED driver, according to the embodiment of the present disclosure.

FIG. 4 illustrates an internal block diagram of a main part of the LED driver 1. The LED driver 1 includes driving circuits 10[1] to 10[n] as the first to n-th channels of driving circuits, a drive reference voltage generation circuit 20, a control circuit 30, an abnormality detection circuit 40, a data holding unit 50, and an internal voltage generation circuit 60. Other portions may be further disposed in the LED driver 1, but they are not illustrated in FIG. 4. If it is not necessary to distinguish the driving circuits 10[1] to 10[n] from each other, any or the whole of the driving circuits 10[1] to 10[n] may be referred to as the driving circuit 10.

The driving circuits 10[1] to 10[n] are connected to the terminals CH[1] to CH[n], respectively. Drive control signals including control signals $S_{PWM}[1]$ to $S_{PWM}[n]$ and $S_{DC}[1]$ to $S_{DC}[n]$ are supplied to the driving circuits 10[1] to 10[n] from the control circuit 30, and the driving circuits 10[1] to 10[n] can drive the light emitting units LL[1] to LL[n] by PWM drive or DC drive, respectively, on the basis of the drive control signals.

When performing the PWM drive, the driving circuit 10[i] drives the corresponding light emitting unit LL[i] to emit pulse light by PWM control based on the control signal $S_{PWM}[i]$, and controls the magnitude of the drive current $I_{LED}[i]$ when the drive current $I_{LED}[i]$ is flowing, in a plurality of steps based on the control signal $S_{DC}[i]$. When performing the DC drive, the driving circuit 10[i] continuously supplies the drive current $I_{LED}[i]$ to the light emitting unit LL[i], so that the light emitting unit LL[i] continuously emit light, and in this case, controls the magnitude of the drive current $I_{LED}[i]$ in a plurality of steps based on the control signal $S_{DC}[i]$.

The drive reference voltage generation circuit 20 supplies a drive reference voltage $V_{DREF}$ to each driving circuit 10. The drive reference voltage $V_{DREF}$ determines the upper limit value of the drive current $I_{LED}[i]$. In other words, the driving circuit 10[i] controls the magnitude of the drive current $I_{LED}[i]$ when the drive current $I_{LED}[i]$ is flowing in a plurality of steps based on the control signal $S_{DC}[i]$, and the upper limit of the magnitude of the drive current $I_{LED}[i]$ is determined depending on the drive reference voltage $V_{DREF}$ (a specific structural example to realize this control is described later). The drive reference voltage $V_{DREF}$ may be generated for each driving circuit 10, or the single common drive reference voltage $V_{DREF}$ may be generated for the driving circuits 10[1] to 10[n].

The control circuit 30 controls the drive reference voltage generation circuit 20 and each driving circuit 10. The control circuit 30 generates the drive control signals including the control signals $S_{PWM}[1]$ to $S_{PWM}[n]$ and $S_{DC}[1]$ to $S_{DC}[n]$ based on a signal from the MPU 2. Specifically, for example, the MPU 2 supplies a drive condition setting signal to the LED driver 1 through the communication wiring 4, and drive setting data based on the drive condition setting signal is stored in the data holding unit 50 (see FIG. 6). The control circuit 30 generates the drive control signal including the control signals $S_{PWM}[1]$ to $S_{PWM}[n]$ and $S_{DC}[1]$ to $S_{DC}[n]$ based on the drive setting data stored in the data holding unit 50.

Figure 5:
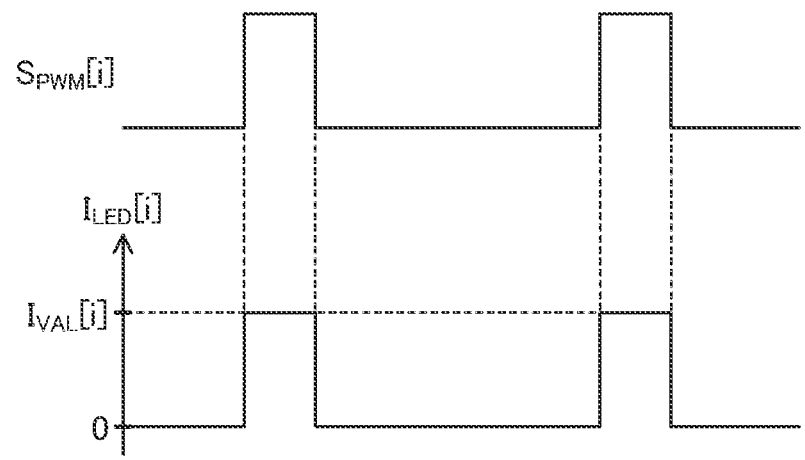
FIG. 5 is a diagram illustrating a relationship between a PWM control signal and a drive current of a light emitting unit, according to the embodiment of the present disclosure.

FIG. 5 illustrates a relationship between the control signal $S_{PWM}[i]$ and the drive current $I_{LED}[i]$ when the PWM drive is performed. The control signal $S_{PWM}[i]$ may have any signal form, and here the control signal $S_{PWM}[i]$ is supposed to be a binary signal having high level or low level. The control signal $S_{PWM}[i]$ has a predetermined PWM frequency. The function of the driving circuit 10[i] makes the value of the drive current $I_{LED}[i]$ be a current value $I_{VAL}[i]$ during the high level period of the control signal $S_{PWM}[i]$, and it makes the value of the drive current $I_{LED}[i]$ be zero during the low level period of the control signal $S_{PWM}[i]$ (a transient state is ignored). The current value $I_{VAL}[i]$ is larger than zero. A ratio of the high level period of the control signal $S_{PWM}[i]$ to the high level period plus the low level period of the control signal $S_{PWM}[i]$ is referred to as an ON duty ratio of the i-th channel. The ON duty ratio of the i-th channel is set in a variable manner in a plurality of steps based on the control signal $S_{PWM}[i]$ (e.g. set in a variable manner in 256 steps). In addition, the current value $I_{VAL}[i]$ is set in a variable manner in a plurality of steps based on the control signal $S_{DC}[i]$ (e.g. set in a variable manner in 256 steps).

When the driving circuit 10[i] performs the DC drive, the drive current $I_{LED}[i]$ having the current value $I_{VAL}[i]$ flows continuously. The DC drive by the driving circuit 10[i] is equivalent that the ON duty ratio of the i-th channel is 100%. When the driving circuit 10[i] performs the DC drive, it can be considered that the control signal $S_{PWM}[i]$ is continuously maintained at high level.

The abnormality detection circuit 40 detects presence or absence of an abnormality related to the LED driver 1. Abnormalities to be detected by the abnormality detection circuit 40 include a temperature abnormality that the LED driver 1 has too high temperature, an input voltage abnormality that the input voltage $V_{IN}$ is too low or too high, and an abnormality related to the terminal $EX_{ISET}$ (details are described later). If no abnormality is detected by the abnormality detection circuit 40, the abnormality detection circuit 40 makes the terminal FAILB be in a high impedance state so as to maintain the level of the wiring 3 at high level. If the abnormality detection circuit 40 detects any abnormality, the abnormality detection circuit 40 cooperates with the pull-up resistor $R_{PU}$ to make the terminal FAILB be at low level. For instance, an open drain FET is provided to the LED driver 1, and the drain of the FET is connected to the terminal FAILB. Then, the abnormality detection circuit 40 controls a gate potential of the FET based on the result of detection of presence or absence of an abnormality. The MPU 2 can determine presence or absence of an abnormality related to the LED driver 1 by monitoring the level of the wiring 3.

Figure 6:
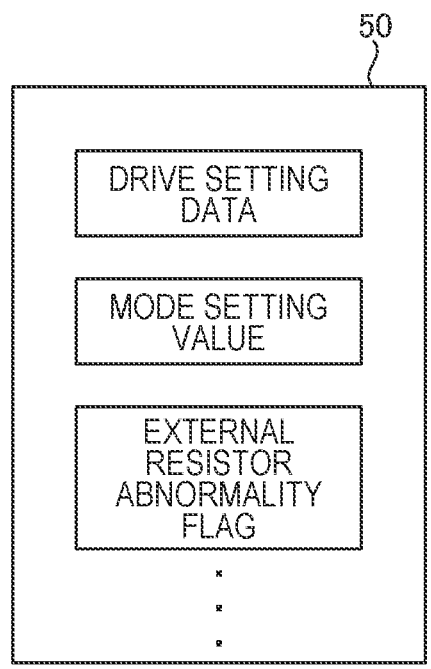
FIG. 6 is a diagram illustrating data stored in a data holding unit of the LED driver, according to the embodiment of the present disclosure.

As illustrated in FIG. 6, the data holding unit 50 stores the drive setting data described above, and also stores a mode setting value and an external resistor abnormality flag. Other than that, various data and flags are stored in the data holding unit 50. The mode setting value and the external resistor abnormality flag are described later. Note that concerning data or the like, to store and to hold can be understood to have the same meaning. The data holding unit 50 may be a random access memory (RAM), or it may be one that is classified into a register or a lookup table, or it may be a combination of logic circuits including a flip-flop and the like. In any case, the data holding unit 50 can hold necessary data and output the held data to the control circuit 30. As long as this function can be realized, the data holding unit 50 may have any type and structure.

The internal voltage generation circuit 60 generates one or more predetermined internal voltage based on the input voltage $V_{IN}$. Each circuit constituting the LED driver 1 operates based on the voltage generated by the internal voltage generation circuit 60.

Hereinafter, in a plurality of examples, some specific structural examples, applied techniques, modified techniques, and the like about the light emitting system SYS are described. The matters described above in the embodiment are applied to the examples described below unless otherwise noted and as long as no contradiction occurs. If there is a contradiction between the matter described above and description in the following example, the description in the following example may be prioritized. In addition, as long as no contradiction occurs among the plurality of examples described below, a matter described in any example can be applied to any other example (i.e. any two or more examples can be combined among the plurality of examples).

First Example

Figure 7:
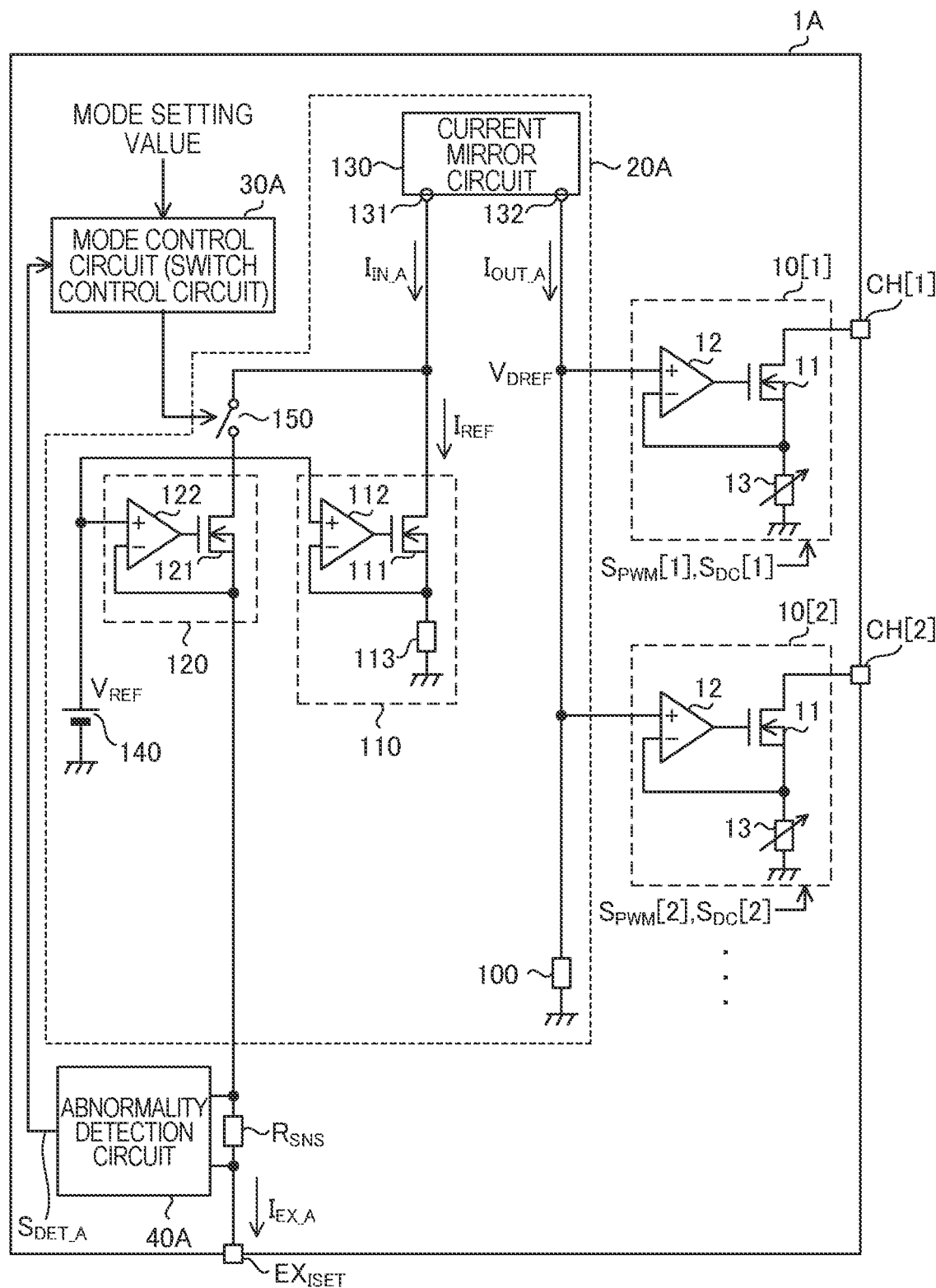
FIG. 7 is an internal structural diagram of the LED driver (without an external resistor), according to a first example of the embodiment of the present disclosure.
Figure 8:
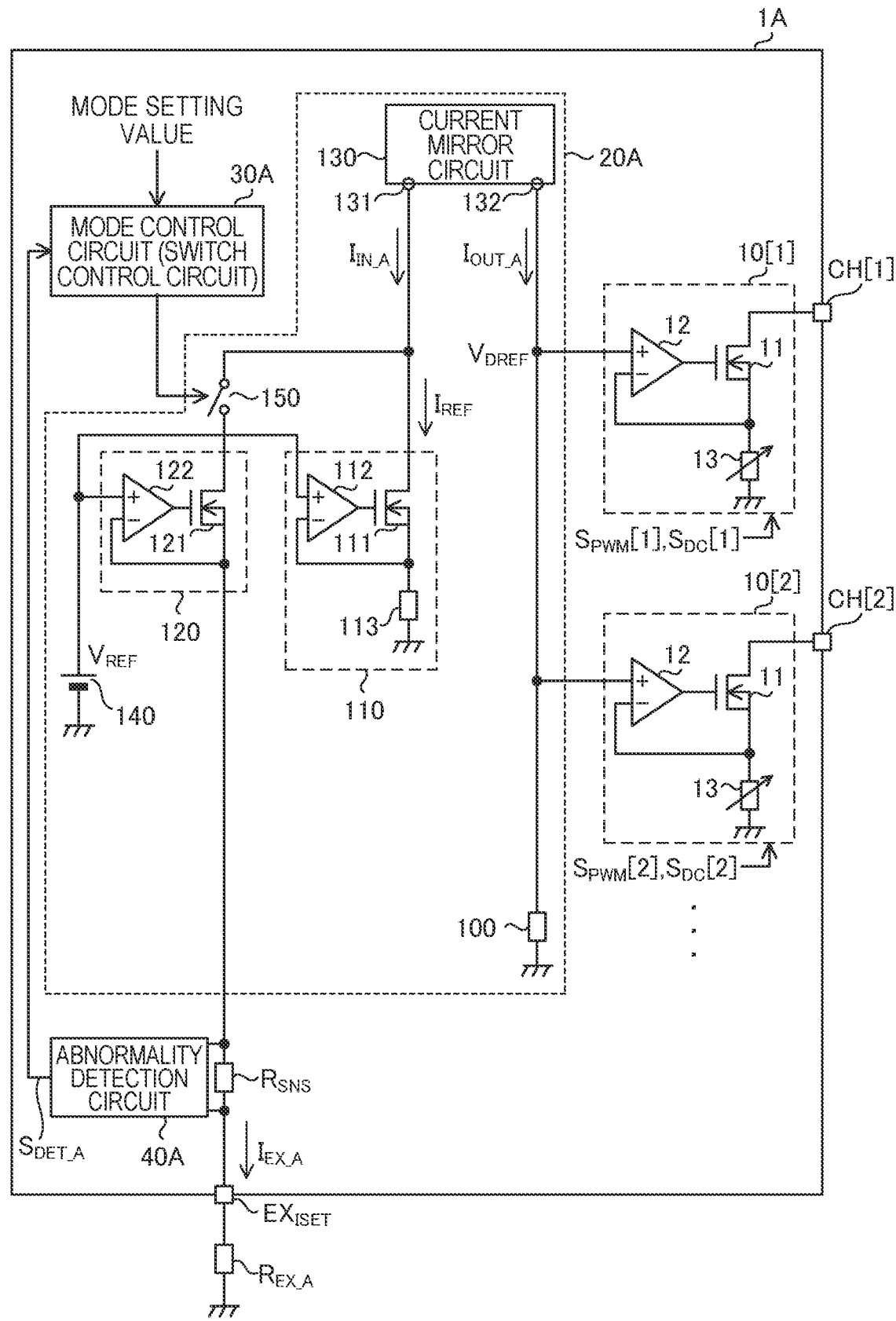
FIG. 8 is an internal structural diagram of the LED driver (with the external resistor), according to the first example of the embodiment of the present disclosure.

A first example is described. FIG. 7 illustrates a partial structural diagram of an LED driver 1A according to the first example. In the first example, the LED driver 1A is used as the LED driver 1. The LED driver 1A includes driving circuits 10[1] to 10[n], a drive reference voltage generation circuit 20A as the drive reference voltage generation circuit 20, a mode control circuit 30A, an abnormality detection circuit 40A and a sense resistor $R_{SNS}$. The terminal $EX_{ISET}$ is a specific external terminal capable of connecting to an external resistor outside the LED driver 1A, and FIG. 8 illustrates a state where an external resistor $R_{EX\_A}$ is connected. In the state illustrated in FIG. 8, the external resistor $R_{EX\_A}$ is disposed outside the LED driver 1A and is connected between the terminal $EX_{ISET}$ and the ground. The external resistor $R_{EX\_A}$ is a discrete component separated from the LED driver 1A and can be a component of the light emitting system SYS. As shown in FIG. 8, the state in which the external resistor $R_{EX\_A}$ is connected between the terminal $EX_{ISET}$ and the ground, is referred to as a state with the external resistor. As shown in FIG. 7, the state in which the terminal $EX_{ISET}$ is not connected to the external resistor $R_{EX\_A}$ but is opened, is referred to as a state without the external resistor.

In the LED driver 1A, the driving circuits 10[1] to 10[n] have the same internal structure, and each driving circuit 10 includes a transistor 11 constituted as an N-channel MOSFET, an amplifier 12 as an operational amplifier, and a resistor 13. The driving circuit 10[i] is connected to the terminal CH[i]. Note that, to avoid complicated illustration, FIG. 7 illustrates internal structures of only two driving circuits 10[1] and 10[2] among then channels of driving circuits 10.

In each driving circuit 10, a drain of the transistor 11 is connected to the corresponding terminal CH. Therefore, the drain of the transistor 11 in the driving circuit 10[i] is connected to the terminal CH[i]. In each driving circuit 10, a source of the transistor 11 is connected to the ground through the resistor 13, an output terminal of the amplifier 12 is connected to a gate of the transistor 11, and a noninverting input terminal of the amplifier 12 is applied with the drive reference voltage $V_{DREF}$ supplied from the circuit 20A. In each driving circuit 10, a connection node between the source of the transistor 11 and the resistor 13 is connected to an inverting input terminal of the amplifier 12.

In each driving circuit 10, the resistor 13 is constituted as a variable resistor. In the driving circuit 10[i], the resistance of the resistor 13 connected to the inverting input terminal of the amplifier 12 is set in a variable manner based on the control signal $S_{DC}$[i], and hence the magnitude of the drive current $I_{LED}$[i] when the transistor 11 is not in the OFF state is set in a variable manner, via gate potential control of the transistor 11 by the amplifier 12. Note that in this embodiment, resistors other than the resistor 13 can be understood to be fixed resistors each of which has a fixed resistance value, unless otherwise noted.

In addition, although not clear in FIG. 7, in the driving circuit 10[i], only during the high level period of the control signal $S_{PWM}$[i], the amplifier 12 controls the gate potential of the transistor 11 so that the drive reference voltage $V_{DREF}$ will be equal to the voltage drop of the resistor 13, and during the low level period of the control signal $S_{PWM}$[i], the output voltage of the amplifier 12 is not supplied to the gate of the transistor 11, so that the transistor 11 is turned off.

In order to realize this control, for example, in the driving circuit 10[i], a switch (not shown) is inserted between the output terminal of the amplifier 12 and the gate of the transistor 11, and only during the high level period of the control signal $S_{PWM}$[i], the switch between the output terminal of the amplifier 12 and the gate of the transistor 11 is turned on. Note that in reality, the transistor 11 can be constituted of a plurality of FETs, and the resistor 13 can be constituted of a plurality of resistors. In this way, the resistance of the resistor 13 disposed between the source of the transistor 11 and the ground can be variable.

When the output voltage of the amplifier 12 is supplied to the gate of the transistor 11 in the driving circuit 10[i], the amplifier 12 controls the gate potential of the transistor 11 so that a voltage difference between the noninverting input terminal and the inverting input terminal thereof will be zero, and hence the light emitting unit LL[i] is supplied with the drive current $I_{LED}$[i] depending on the resistance of the resistor 13 connected to the inverting input terminal of the amplifier 12.

When the driving circuit 10[$i$] performs the DC drive, the current value $I_{VAL}[i]$ of the drive current $I_{LED}[i]$ (see FIG. 5) is controlled in a plurality of steps based on the control signal $S_{DC}[i]$. When the driving circuit 10[$i$] performs the PWM drive, the ON duty ratio of the i-th channel and the current value $I_{VAL}[i]$ of the drive current $I_{LED}[i]$ during the high level period of the control signal $S_{PWM}[i]$ (see FIG. 5) are controlled separately in a plurality of steps, on the basis of the control signals $S_{PWM}[i]$ and $S_{DC}[i]$.

In the driving circuit 10[$i$], the resistance of the resistor 13 is set in a variable manner in a plurality of steps within a predetermined variable resistance range, and in conjunction with this, the current value $I_{VAL}[i]$ is set in a variable manner in a plurality of steps within a predetermined variable current range. In the driving circuit 10[$i$], when the resistance of the resistor 13 is equal to the minimum value of the variable resistance range, the current value $I_{VAL}[i]$ is maximized, and the current value $I_{VAL}[i]$ decreases along with increase in the resistance of the resistor 13.

When the minimum value of the variable resistance range is denoted by $R13_{MIN}$, the upper limit value of the drive current $I_{LED}[i]$ (i.e. the current value $I_{VAL}[i]$ when the resistance of the resistor 13 is equal to the minimum value of the variable resistance range) depends on the drive reference voltage $V_{DREF}$ and is expressed by $V_{DREF}/R13_{MIN}$. When the driving circuit 10[$i$] performs the DC drive, the upper limit value of the drive current $I_{LED}[i]$ indicates the upper limit of the value of the drive current $I_{LED}[i]$ that flows continuously. When the driving circuit 10[$i$] performs the PWM drive, the upper limit value of the drive current $I_{LED}[i]$ indicates the upper limit of the instantaneous value of the drive current $I_{LED}[i]$ when the drive current $I_{LED}[i]$ is flowing (i.e. the upper limit of the instantaneous value of the drive current $I_{LED}[i]$ during the high level period of the control signal $S_{PWM}[i]$).

The drive reference voltage generation circuit 20A has a variable setting function of the drive reference voltage $V_{DREF}$ that defines the upper limit value of the drive current $I_{LED}[i]$. The drive reference voltage generation circuit 20A includes a resistor 100 that is an internal resistor for generating the drive reference voltage, a reference current generation circuit 110, a current superimposing circuit 120, a current mirror circuit 130, a reference voltage generation unit 140, and a switch 150.

The reference current generation circuit 110 includes a transistor 111 constituted as an N-channel MOSFET, an amplifier 112 that is an operational amplifier, and a resistor 113. A drain of the transistor 111 is connected to an input terminal 131 of the current mirror circuit 130, and a source of the transistor 111 is connected to the ground through the resistor 113. A gate of the transistor 111 is connected to an output terminal of the amplifier 112. The connection node between the source of the transistor 111 and the resistor 113 is connected to an inverting input terminal of the amplifier 112. A noninverting input terminal of the amplifier 112 is applied with a predetermined reference voltage $V_{REF}$ (e.g. 0.6 V). Therefore, a reference current $I_{REF}$ determined by the resistance of the resistor 113 and the voltage value of the reference voltage $V_{REF}$ flows between drain and source of the transistor 111.

The current superimposing circuit 120 includes a transistor 121 constituted as an N-channel MOSFET, and an amplifier 122 that is an operational amplifier. A drain of the transistor 121 is connected to one terminal of the switch 150, and the other terminal of the switch 150 is connected to the input terminal 131 of the current mirror circuit 130. In other words, the switch 150 is inserted in series between the drain of the transistor 121 and the input terminal 131. A source of the transistor 121 is connected to the terminal $EX_{ISET}$ through the sense resistor $R_{SNS}$. A gate of the transistor 121 is connected to the output terminal of the amplifier 122. The source of the transistor 121 is connected to an inverting input terminal of the amplifier 122. A noninverting input terminal of the amplifier 122 is applied with the predetermined reference voltage $V_{REF}$.

The current mirror circuit 130 has an input terminal 131 and an output terminal 132, and outputs from the output terminal 132 an output side current $I_{OUT\_A}$ that is $k_A$ times an input side current $I_{IN\_A}$ flowing through the input terminal 131. Here, $k_A$ is any real number and may be 1. The output terminal 132 is connected to one end of the resistor 100, and the other end of the resistor 100 is connected to the ground. In addition, the output terminal 132 is connected to the noninverting input terminal of the amplifier 12 in each of the driving circuits 10[1] to 10[$n$]. Therefore, the voltage generated across the resistor 100 when the output side current $I_{OUT\_A}$ flows through the resistor 100 becomes the drive reference voltage $V_{DREF}$.

The reference voltage generation unit 140 generates the reference voltage $V_{REF}$ having a predetermined positive DC voltage value. The reference voltage generation unit 140 can be understood to be a component of the circuits 110 and 120, which is shared between the circuits 110 and 120.

The mode control circuit 30A is a part of the control circuit 30 illustrated in FIG. 4, and controls the state of the switch 150 based on the mode setting value stored in the data holding unit 50 (FIG. 6). In this case, the external resistor abnormality flag having a value of 0 or 1 is also referred to (details are described later). The mode setting value has a value of 1 or 2. On the basis of a mode setting signal sent from the microcomputer 2 to the LED driver 1 (here, the LED driver 1A), the mode setting value is determined. The mode setting value has an initial value of 1, and remains 1 unless the LED driver 1 (here, the LED driver 1A) receives the mode setting signal.

When the external resistor abnormality flag has a value of 0, the mode control circuit 30A operates the circuit 20A in a mode $MD_{A1}$ if the mode setting value is 1, while it operates the same in a mode $MD_{A2}$ if the mode setting value is 2. When the external resistor abnormality flag has a value of 1, the mode control circuit 30A operates the circuit 20A in the mode $MD_{A1}$ regardless of the mode setting value.

When operating the circuit 20A in the mode $MD_{A1}$, the mode control circuit 30A maintains the switch 150 in the OFF state. When operating the circuit 20A in the mode $MD_{A2}$, the mode control circuit 30A maintains the switch 150 in the ON state. Therefore, the mode control circuit 30A can be said to be a switch control circuit that controls the state of the switch 150 based on the mode setting value.

The mode $MD_{A1}$ is a mode to generate the drive reference voltage $V_{DREF}$ regardless of the state of the terminal $EX_{ISET}$. In other words, in the mode $MD_{A1}$, the switch 150 is turned off, and hence the constant drive reference voltage $V_{DREF}$ is generated regardless of whether or not the terminal $EX_{ISET}$ is connected to the external resistor $R_{EX\_A}$, or whether or not the terminal $EX_{ISET}$ is short-circuited to the ground, or whether or not the terminal $EX_{ISET}$ is applied with any voltage.

The mode $MD_{A2}$ is a mode that functions significantly in the state with the external resistor, and is a mode to generate the drive reference voltage $V_{DREF}$ in accordance with the current flowing through the terminal $EX_{ISET}$ (a second mode current).

The abnormality detection circuit 40A is a part of the abnormality detection circuit 40 illustrated in FIG. 4. In the mode $MD_{A2}$, the abnormality detection circuit 40A detects the voltage across the sense resistor $R_{SNS}$ so as to detect the magnitude of current $I_{EX\_A}$ flowing in the terminal $EX_{ISET}$, and based on the detection result, it detects whether or not the current $I_{EX\_A}$ has an abnormality. In the mode $MD_{A2}$, if the voltage across the sense resistor $R_{SNS}$ is a predetermined value (e.g. 175 mV) or more, the abnormality detection circuit 40A outputs a detection result signal $S_{DET\_A}$ at high level, and otherwise it outputs the detection result signal $S_{DET\_A}$ at low level. The high level detection result signal $S_{DET\_A}$ indicates that the current $I_{EX\_A}$ is excessive. When the switch 150 is turned on, if the terminal $EX_{ISET}$ is short-circuited to the ground, or if the resistance value of the external resistor $R_{EX\_A}$ connected to the terminal $EX_{ISET}$ is too low, the detection result signal $S_{DET\_A}$ becomes high level. The detection result signal $S_{DET\_A}$ is sent to the mode control circuit 30A. Note that the output signal ($S_{DET\_A}$) of the abnormality detection circuit 40A in the mode $MD_{A1}$ is invalid.

The mode control circuit 30A controls the value of the external resistor abnormality flag (see FIG. 6). The external resistor abnormality flag has an initial value of 0. When the mode control circuit 30A receives the high level detection result signal $S_{DET\_A}$ from the abnormality detection circuit 40A in the mode $MD_{A2}$ (i.e. when the switch 150 is turned on), it sets the external resistor abnormality flag to 1, and then maintains the value of the external resistor abnormality flag at 1. The value of the external resistor abnormality flag is maintained at 1 until the power supply to the LED driver 1A is turned off, or until a specific signal is supplied from the MPU 2 to the LED driver 1A. As described above, when the external resistor abnormality flag has a value of 1, the operation mode of the circuit 20A is the mode $MD_{A1}$ regardless of the mode setting value. Therefore, if the abnormality detection circuit 40A detects an abnormality during operation in the mode $MD_{A2}$ (i.e. if external resistor abnormality flag is set to 1), the switch 150 is switched from on to off, and the operation mode of the circuit 20A is changed from the mode $MD_{A2}$ to the mode $MD_{A1}$.

The case where the circuit 20A operates in the mode $MD_{A1}$ is referred to as a case $CS_{A1}$. In the case $CS_{A1}$, the switch 150 is turned off, and hence the input side current $I_{IN\_A}$ is equal to the reference current $I_{REF}$. The case where the circuit 20A operates in the mode $MD_{A2}$ in the state with the external resistor is referred to as a case $CS_{A2}$. In the case $CS_{A2}$, the switch 150 is turned on, and hence the input side current $I_{IN\_A}$ is equal to the sum of the reference current $I_{REF}$ and the current $I_{EX\_A}$ that flows through the terminal $EX_{ISET}$ and the external resistor $R_{EX\_A}$. Therefore, the drive reference voltage $V_{DREF}$ in the case $CS_{A2}$ is higher than that in the case $CS_{A1}$. As a result, the upper limit value of the drive current $I_{LED}[i]$ in each driving circuit 10 is higher in the case $CS_{A2}$ than that in the case $CS_{A1}$. The upper limit value of the drive current $I_{LED}[i]$ in the case $CS_{A2}$ is determined depending on the magnitude of the current $I_{EX\_A}$ (therefore depending on the resistance value of the external resistor $R_{EX\_A}$).

Hereinafter, the operation of the LED driver 1A is summarized. The drive reference voltage generation circuit 20A operates selectively in the mode $MD_{A1}$ to generate the drive reference voltage $V_{DREF}$ regardless of the state of the terminal $EX_{ISET}$, or in the mode $MD_{A2}$ to generate the drive reference voltage $V_{DREF}$ in accordance with the current $I_{EX\_A}$ through the terminal $EX_{ISET}$ (the second mode current).

As described above, outside the LED driver 1A, the external resistor $R_{EX\_A}$ is connected or not between the terminal $EX_{ISET}$ and the ground. When the circuit 20A operates in the mode $MD_{A2}$ in the state where the external resistor $R_{EX\_A}$ is connected between the terminal $EX_{ISET}$ and the ground, the circuit 20A supplies the current $I_{EX\_A}$ to the external resistor $R_{EX\_A}$ through the terminal $EX_{ISET}$, and generates the drive reference voltage $V_{DREF}$ in accordance with the magnitude of the current $I_{EX\_A}$ at that time. In this case, the drive reference voltage $V_{DREF}$ when the circuit 20A operates in the mode $MD_{A2}$ in the state where the external resistor $R_{EX\_A}$ is connected between the terminal $EX_{ISET}$ and the ground depends on the resistance value of the external resistor $R_{EX\_A}$, and is higher than the drive reference voltage $V_{DREF}$ in the mode $MD_{A1}$. Along with the increase in the drive reference voltage $V_{DREF}$, the driving circuit 10[i] increases the upper limit value of the drive current $I_{LED}[i]$. In this way, the upper limit value of the drive current $I_{LED}[i]$ can be increased in the mode $MD_{A2}$.

The drive reference voltage generation circuit 20A includes the reference current generation circuit 110 that generates the reference current $I_{REF}$ commonly in the mode $MD_{A1}$ and in the mode $MD_{A2}$, the current superimposing circuit 120 that generates the current $I_{EX\_A}$ only in the mode $MD_{A2}$ out of the mode $MD_{A1}$ and the mode $MD_{A2}$, and the current mirror circuit 130 that generates the output side current $I_{OUT\_A}$ proportional to the input side current $I_{IN\_A}$, and it generates the drive reference voltage $V_{DREF}$ in proportion to the output side current $I_{OUT\_A}$. In the mode $MD_{A1}$, the input side current $I_{IN\_A}$ is equal to the reference current $I_{REF}$, while in the mode $MD_{A2}$, the input side current $I_{IN\_A}$ is equal to the reference current $I_{REF}$ plus the current $I_{EX\_A}$.

The drive reference voltage generation circuit 20A includes the switch 150 inserted in series between the input terminal 131 of the current mirror circuit 130 and the terminal $EX_{ISET}$. The LED driver 1A further includes the switch control circuit (30A) that controls the switch 150. The switch control circuit (30A) turns off the switch 150 in the mode $MD_{A1}$, while it turns on the switch 150 in the mode $MD_{A2}$, so as to superimpose the current $I_{EX\_A}$ flowing through the terminal $EX_{ISET}$ on the input side current $I_{IN\_A}$.

The abnormality detection circuit 40A detects whether or not the current $I_{EX\_A}$ has an abnormality based on the magnitude of the current $I_{EX\_A}$ flowing through the terminal $EX_{ISET}$ in the mode $MD_{A2}$. The switch control circuit (30A) keeps turning on the switch 150 if the abnormality detection circuit 40A does not detect an abnormality in the mode $MD_{A2}$ (if the value of the external resistor abnormality flag is 0). If the abnormality detection circuit 40A detects an abnormality in the mode $MD_{A2}$ (if the value of the external resistor abnormality flag is 1), the switch control circuit (30A) switches the switch 150 from on to off, so that the operation mode of the circuit 20A transfers from the mode $MD_{A2}$ to the mode $MD_{A1}$.

When considering heating or the like of the light emitting unit LL or the transistor 11, an appropriate upper limit of the drive current $I_{LED}[i]$ should be determined. On the other hand, if the external resistor $R_{EX\_A}$ is essential for setting the upper limit, the number of components of the light emitting system SYS is increased. Therefore, in order to avoid the increase in the number of components, the mode $MD_{A1}$ is provided, in which the appropriate upper limit of the drive current $I_{LED}[i]$ is determined without requiring the external resistor $R_{EX\_A}$.

However, depending on the light emitting system SYS, it may be requested to increase the upper limit of the drive current $I_{LED}[i]$. Considering this, the LED driver 1A adopts the structure that supports the request that requires the external resistor $R_{EX\_A}$. The operation in the mode $MD_{A2}$ with the external resistor $R_{EX\_A}$ can realize increase in the upper limit of the drive current $I_{LED}[i]$. In this way, to satisfy a request in the light emitting system SYS, the single LED driver 1A can be used both as a LED driver having the upper limit value of the drive current $I_{LED}[i]$ that is a first upper limit value (e.g. 60 mA), and as a LED driver having the upper limit value of the drive current $I_{LED}[i]$ that is a second upper limit value (e.g. 125 mA) higher than the first upper limit value. In other words, it is possible to provide the LED driver having high versatility in the upper limit of the drive current.

However, in such a case where the terminal $EX_{ISET}$ is short-circuited to the ground in the mode $MD_{A2}$, if the current $I_{EX\_A}$ becomes too large, the upper limit value of the drive current $I_{LED}[i]$ also becomes too large, and the light emitting unit LL[i] and the transistor 11 may be in an overcurrent state. By providing the abnormality detection circuit 40A, they can be prevented from being in the overcurrent state.

As the light emitting system SYS, it is possible to realize selectively a first light emitting system that operates in the mode $MD_{A1}$ without the external resistor $R_{EX\_A}$, or a second light emitting system that operates in the mode $MD_{A2}$ with the external resistor $R_{EX\_A}$. In the first light emitting system, the operation of the current superimposing circuit 120 is not necessary. Therefore, when the circuit 20A operates in the mode $MD_{A1}$, the mode control circuit 30A cuts off power supply to the amplifier 122 in conjunction with the switch 150 turned off, so as to stop the operation of the current superimposing circuit 120. Therefore, wasteful power consumption does not occur in the light emitting system SYS operated as the first light emitting system. On a circuit board where electronic components of the first light emitting system are mounted, the terminal $EX_{ISET}$ may be short-circuited to the ground depending on the design thereof. However, as long as it operates in the mode $MD_{A1}$, the switch 150 and the transistor 121 are both turned off, and hence leak current through them is so small that it can be ignored, and there is no problem. In the current superimposing circuit 120, a pull-down resistor may be disposed between the gate of the transistor 121 and the ground.

Second Example

A second example is described. In the second example, a modified technique that can be applied to the first example is described. In the structure of FIG. 7, the voltage across the single resistor 100 (the voltage drop by the single resistor 100) is supplied as the drive reference voltage $V_{DREF}$ commonly to all the driving circuits 10[1] to 10[n], but it may be possible to generate the drive reference voltage $V_{DREF}$ for each channel in the LED driver 1A.

Figure 9:
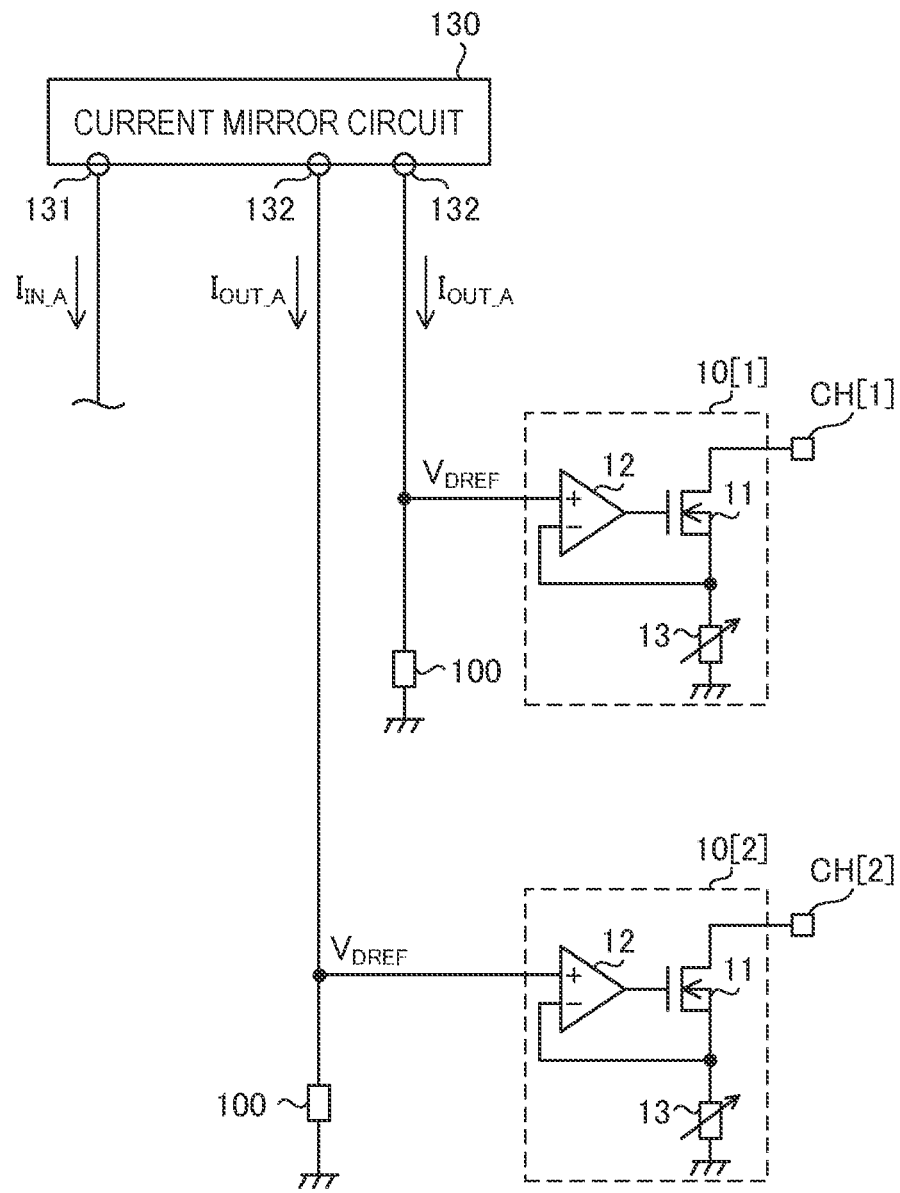
FIG. 9 is a modified internal structural diagram of a part of the LED driver, according to a second example of the embodiment of the present disclosure.

The generation of the drive reference voltage $V_{DREF}$ for each channel in the LED driver 1A can be performed as follows. Specifically, as illustrated in FIG. 9, the current mirror circuit 130 is provided with total n, i.e. first to n-th channels of the output terminals 132, and total n, i.e. first to n-th channels of the resistors 100 are disposed in the drive reference voltage generation circuit 20A (n=2 is supposed in FIG. 9). Then, the first to n-th channels of the output terminals 132 are connected to the ground through the first to n-th channels of the resistors 100, respectively, and the output side current $I_{OUT\_A}$ is output from each of the first to n-th channels of the output terminals 132. In this way, the first to n-th channels of the resistors 100 generate the first to n-th channels of the drive reference voltages $V_{DREF}$, respectively. In the i-th channel, the connection node between the output terminal 132 and the resistor 100 is connected to the noninverting input terminal of the amplifier 12 in the driving circuit 10[i]. Therefore, the noninverting input terminals of the amplifiers 12 in the driving circuits 10[1] to 10[n] (i.e. the first to n-th channels of the driving circuits 10) are supplied with the first to n-th channels of the drive reference voltages $V_{DREF}$, respectively. The first to n-th channels of the resistors 100 all have the same resistance value.

Note that it may be possible to group the first to n-th channels into two or more blocks in the LED driver 1A, and to generate the drive reference voltage $V_{DREF}$ for each of the blocks. Each block includes two or more channels.

Third Example

Figure 10:
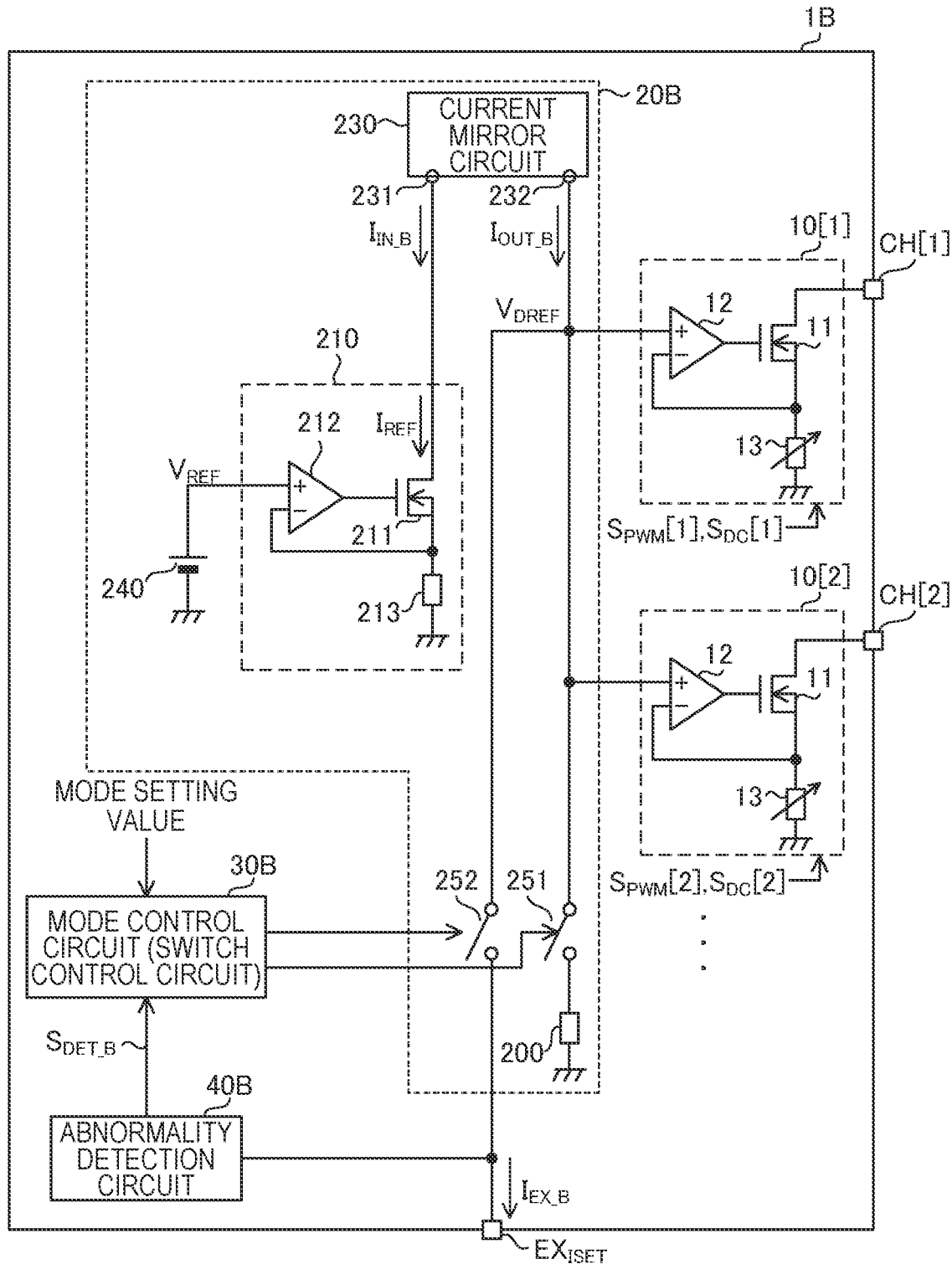
FIG. 10 is an internal structural diagram of the LED driver (without the external resistor), according to a third example of the embodiment of the present disclosure.
Figure 11:
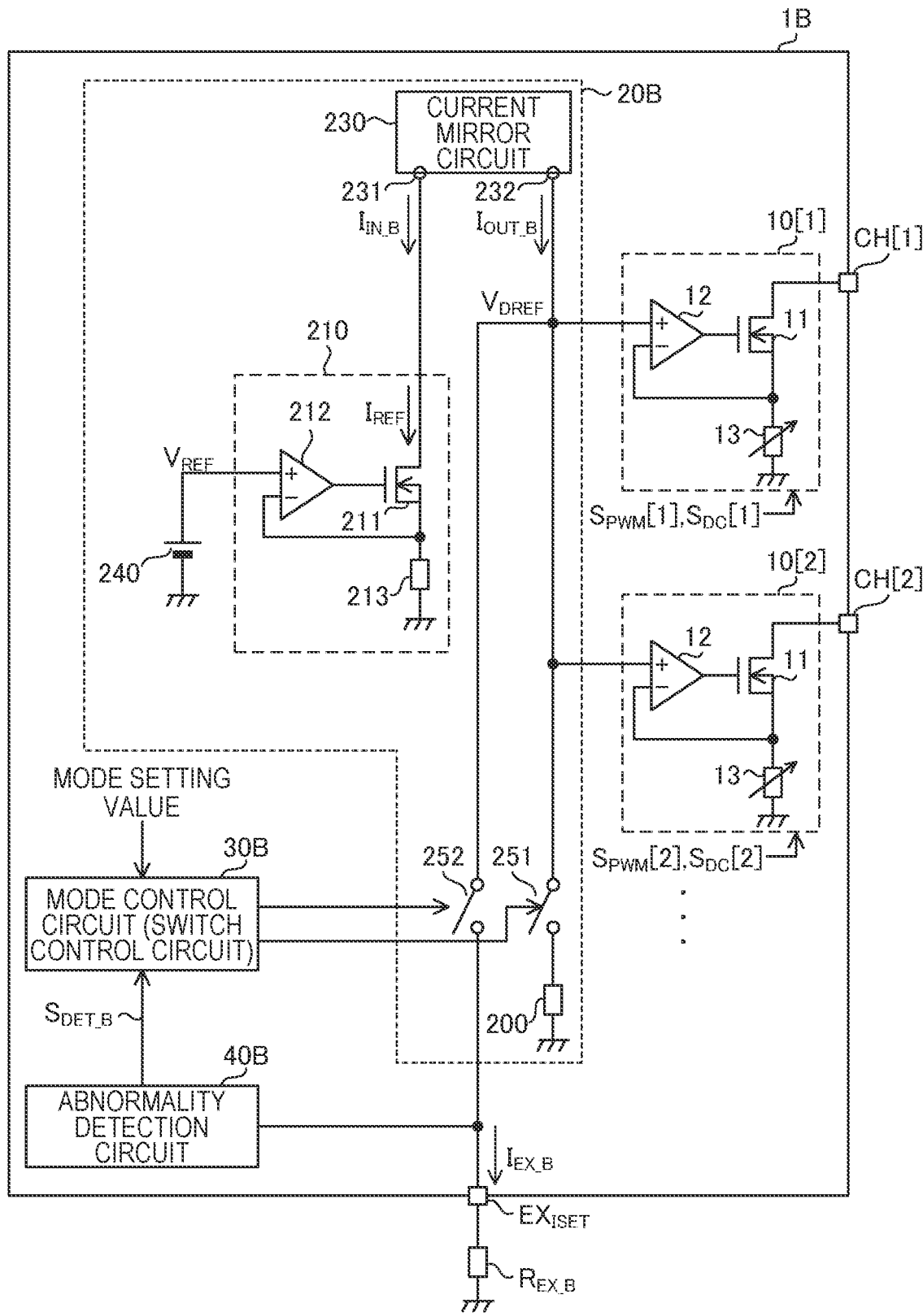
FIG. 11 is an internal structural diagram of the LED driver (with the external resistor), according to the third example of the embodiment of the present disclosure.

A third example is described. FIG. 10 illustrates a partial structural diagram of an LED driver 1B according to the third example. In the third example, the LED driver 1B is used as the LED driver 1. The LED driver 1B includes the driving circuits 10[1] to 10[n], a drive reference voltage generation circuit 20B as the drive reference voltage generation circuit 20, a mode control circuit 30B, and an abnormality detection circuit 40B. The terminal $EX_{ISET}$ is a specific external terminal capable of connecting to an external resistor outside the LED driver 1B, and FIG. 11 illustrates a state where an external resistor $R_{EX\_B}$ is connected. In the state illustrated in FIG. 11, the external resistor $R_{EX\_B}$ is disposed outside the LED driver 1B and is connected between the terminal $EX_{ISET}$ and the ground. The external resistor $R_{EX\_B}$ is a discrete component separated from the LED driver 1A and can be a component of the light emitting system SYS. As shown in FIG. 11, the state in which the external resistor $R_{EX\_B}$ is connected between the terminal $EX_{ISET}$ and the ground, is referred to as the state with the external resistor. As shown in FIG. 10, the state in which the terminal $EX_{ISET}$ is not connected to the external resistor $R_{EX\_B}$ but is opened, is referred to as the state without the external resistor.

The internal structure and operation of each driving circuit 10 in the LED driver 1B are the same as those in the LED driver 1A (i.e. the same as described above in the first example). The matter described above for the driving circuit 10 and the drive current $I_{LED}$ in the first example is all applied to the third example. Note that to avoid complicated illustration, FIG. 10 illustrates internal structure of only two driving circuits 10[1] and 10[2] among then channels of driving circuits 10.

The drive reference voltage generation circuit 20B has the variable setting function of the drive reference voltage $V_{DREF}$ that defines the upper limit value of the drive current $I_{LED}[i]$. The drive reference voltage generation circuit 20B includes a resistor 200 that is an internal resistor for generating the drive reference voltage, a reference current generation circuit 210, a current mirror circuit 230, a reference voltage generation unit 240, and switches 251 and 252.

The reference current generation circuit 210 includes a transistor 211 constituted as an N-channel MOSFET, an amplifier 212 that is an operational amplifier, and a resistor 213. A drain of the transistor 211 is connected to an input terminal 231 of the current mirror circuit 230, and a source of the transistor 211 is connected to the ground through the resistor 213. A gate of the transistor 211 is connected to an output terminal of the amplifier 212. The connection node between the source of the transistor 211 and the resistor 213 is connected to an inverting input terminal of the amplifier 212. A noninverting input terminal of the amplifier 212 is applied with the predetermined reference voltage $V_{REF}$ (e.g. 0.6 V). Therefore, the reference current $I_{REF}$ determined by the resistance of the resistor 213 and the voltage value of the reference voltage $V_{REF}$ flows between drain and source of the transistor 211.

The current mirror circuit 230 has an input terminal 231 and an output terminal 232, and outputs from the output terminal 232 an output side current $I_{OUT\_B}$ that is $k_B$ times an input side current $I_{IN\_B}$ flowing through the input terminal 231. Here, $k_B$ is any real number and may be 1. In the LED driver 1B, the input side current $I_{IN\_B}$ is always equal to the reference current $I_{REF}$ by the reference current generation circuit 210. The output terminal 232 is connected commonly to one end of the switch 251 and to one end of the switch 252. The other end of the switch 251 is connected to the ground through the resistor 200, and the other end of the switch 252 is connected to the terminal $EX_{ISET}$. In addition, the output terminal 232 is connected to the noninverting input terminal of the amplifier 12 in each of the driving circuits 10[1] to 10[n].

The reference voltage generation unit 240 generates the reference voltage $V_{REF}$ having a predetermined positive DC voltage value. The reference voltage generation unit 240 can be understood to be a component of the reference current generation circuit 210.

The mode control circuit 30B is a part of the control circuit 30 illustrated in FIG. 4, and it controls states of the switches 251 and 252 based on the mode setting value stored in the data holding unit 50 (FIG. 6). In this case, the external resistor abnormality flag having a value of 0 or 1 is also referred to (details are described later). The mode setting value has a value of 1 or 2. On the basis of the mode setting signal sent from the microcomputer 2 to the LED driver 1 (here, the LED driver 1B), the mode setting value is determined. The mode setting value has an initial value of 1, and remains 1 unless the LED driver 1 (here, the LED driver 1B) receives the mode setting signal.

When the external resistor abnormality flag has a value of 0, the mode control circuit 30B operates the circuit 20B in a mode $MD_{B1}$ if the mode setting value is 1, while it operates the same in a mode $MD_{B2}$ if the mode setting value is 2. When the external resistor abnormality flag has a value of 1, the mode control circuit 30B operates the circuit 20B in the mode $MD_{B1}$ regardless of the mode setting value.

When operating the circuit 20B in the mode $MD_{B1}$, the mode control circuit 30B maintains the switch 251 in the ON state and the switch 252 in the OFF state. When operating the circuit 20B in the mode $MD_{B2}$, the mode control circuit 30B maintains the switch 251 in the OFF state and the switch 252 in the ON state. Therefore, the mode control circuit 30B can be said to be a switch control circuit that controls the states of the switches 251 and 252 based on the mode setting value.

The mode $MD_{B1}$ is a mode to generate the drive reference voltage $V_{DREF}$ regardless of the state of the terminal $EX_{ISET}$. In other words, in the mode $MD_{B1}$, the switch 251 is turned on while the switch 252 is turned off, and hence the constant drive reference voltage $V_{DREF}$ is generated regardless of whether or not the terminal $EX_{ISET}$ is connected to the external resistor $R_{EX\_B}$, or whether or not the terminal $EX_{ISET}$ is short-circuited to the ground, or whether or not the terminal $EX_{ISET}$ is applied with any voltage. In the mode $MD_{B1}$, the drive reference voltage $V_{DREF}$ is a voltage generated across the resistor 200 when the output side current $I_{OUT\_B}$ flows through the resistor 200.

The mode $MD_{B2}$ is a mode that functions significantly in the state with the external resistor, and is a mode to generate the drive reference voltage $V_{DREF}$ in accordance with the current flowing through the terminal $EX_{ISET}$ (a second mode current). In the mode $MD_{B2}$, the drive reference voltage $V_{DREF}$ is a voltage at the terminal $EX_{ISET}$. If the external resistor $R_{EX\_B}$ is disposed between the terminal $EX_{ISET}$ and the ground in the mode $MD_{B2}$, the drive reference voltage $V_{DREF}$ is a voltage generated across the external resistor $R_{EX\_B}$ when the output side current $I_{OUT\_B}$ flows through the external resistor $R_{EX\_B}$.

The abnormality detection circuit 40B is a part of the abnormality detection circuit 40 illustrated in FIG. 4. In the mode $MD_{B2}$, the abnormality detection circuit 40B detects the voltage at the terminal $EX_{ISET}$ so as to detect whether or not the drive reference voltage $V_{DREF}$ has an abnormality. In other words, it detects whether or not the current $I_{EX\_B}$ flowing through the terminal $EX_{ISET}$ has an abnormality. In the mode $MD_{B2}$, if the voltage at the terminal $EX_{ISET}$ is within a predetermined normal voltage range, the abnormality detection circuit 40B outputs a detection result signal $S_{DET\_B}$ at low level, while if the voltage at the terminal $EX_{ISET}$ is outside the normal voltage range, it outputs the detection result signal $S_{DET\_B}$ at high level. Here, the normal voltage range is the voltage range from a predetermined lower limit voltage (e.g. 0.3 V) to a predetermined upper limit voltage (e.g. 3.5 V). The lower limit voltage and the upper limit voltage are positive voltages, and the upper limit voltage is higher than the lower limit voltage. The high level detection result signal $S_{DET\_B}$ indicates that the voltage at the terminal $EX_{ISET}$ is too high or too low. In the mode $MD_{B2}$ (i.e. when the switch 252 is turned on), if the terminal $EX_{ISET}$ is short-circuited to the ground, or if the resistance value of the external resistor $R_{EX\_B}$ connected to the terminal $EX_{ISET}$ is too small, the voltage at the terminal $EX_{ISET}$ becomes lower than the lower limit voltage described above, and the detection result signal $S_{DET\_B}$ becomes high level. In addition, in the mode $MD_{B2}$, if the terminal $EX_{ISET}$ is open, or if the resistance value of the external resistor $R_{EX\_B}$ connected to the terminal $EX_{ISET}$ is too large, the voltage at the terminal $EX_{ISET}$ becomes higher than the upper limit voltage described above, and the detection result signal $S_{DET\_B}$ becomes high level. The detection result signal $S_{DET\_B}$ is sent to the mode control circuit 30B. Note that the output signal ($S_{DET\_B}$) of the abnormality detection circuit 40B in the mode $MD_{B1}$ is invalid.

The mode control circuit 30B controls the value of the external resistor abnormality flag (see FIG. 6). The external resistor abnormality flag has an initial value of 0. When the mode control circuit 30B receives the high level detection result signal $S_{DET\_B}$ from the abnormality detection circuit 40B in the mode $MD_{B2}$ (i.e. when the switch 251 is turned off and the switch 252 is turned on), it sets the external resistor abnormality flag to 1, and then maintains the value of the external resistor abnormality flag at 1. The value of the external resistor abnormality flag is maintained at 1 until the power supply to the LED driver 1B is turned off, or until a specific signal is supplied from the MPU 2 to the LED driver 1B. As described above, when the external resistor abnormality flag has a value of 1, the operation mode of the circuit 20B is the mode $MD_{B1}$ regardless of the mode setting value. Therefore, if the abnormality detection circuit 40B detects an abnormality during operation in the mode $MD_{B2}$ (i.e. if external resistor abnormality flag is set to 1), the switch 251 is switched from off to on while the switch 252 is switched from on to off, and the operation mode of the circuit 20B is changed from the mode $MD_{B2}$ to the mode $MD_{B1}$.

The case where the circuit 20B operates in the mode $MD_{B1}$ is referred to as a case $CS_{B1}$. In the case $CS_{B1}$, the switch 251 is turned on while the switch 252 is turned off, and hence the drive reference voltage $V_{DREF}$ is determined by the values of the output side current $I_{OUT\_B}$ and the resistor 200. The case where the circuit 20B operates in the mode $MD_{B2}$ in the state with the external resistor is referred to as a case $CS_{B2}$. In the case $CS_{B2}$, the switch 251 is turned off while the switch 252 is turned on, and hence the drive reference voltage $V_{DREF}$ is determined by the values of the output side current $I_{OUT\_B}$ and the external resistor $R_{EX\_B}$. In the case $CS_{B2}$, except for an abnormal state, the external resistor $R_{EX\_B}$ having a resistance value larger than that of the resistor 200 is used. Therefore, the drive reference voltage $V_{DREF}$ in the case $CS_{B2}$ is higher than that in the case $CS_{B1}$. As a result, the upper limit value of the drive current $I_{LED}[i]$ in each driving circuit 10 in the case $CS_{B2}$ is higher than that in the case $CS_{B1}$. The upper limit value of the drive current $I_{LED}[i]$ in the case $CS_{B2}$ is determined depending on the resistance value of the external resistor $R_{EX\_B}$.

Hereinafter, the operation of the LED driver 1B is summarized. The drive reference voltage generation circuit 20B operates selectively in the mode $MD_{B1}$ to generate the drive reference voltage $V_{DREF}$ regardless of the state of the terminal $EX_{ISET}$, or in the mode $MD_{B2}$ to generate the drive reference voltage $V_{DREF}$ in accordance with the current $I_{EX\_B}$ through the terminal $EX_{ISET}$ (the second mode current).

As described above, outside the LED driver 1B, the external resistor $R_{EX\_B}$ is connected or not between the terminal $EX_{ISET}$ and the ground. When the circuit 20B operates in the mode $MD_{B2}$ in the state where the external resistor $R_{EX\_B}$ is connected between the terminal $EX_{ISET}$ and the ground, the circuit 20B supplies the current $I_{EX\_B}$ to the external resistor $R_{EX\_B}$ through the terminal $EX_{ISET}$, and generates the drive reference voltage $V_{DREF}$ in accordance with the voltage generated by the external resistor $R_{EX\_B}$ at that time. In this case, the drive reference voltage $V_{DREF}$ when the circuit 20B operates in the mode $MD_{B2}$ in the state where the external resistor $R_{EX\_B}$ is connected between the terminal $EX_{ISET}$ and the ground depends on the resistance value of the external resistor $R_{EX\_B}$, and is higher than the drive reference voltage $V_{DREF}$ in the mode $MD_{B1}$. Along with increase in the drive reference voltage $V_{DREF}$, the driving circuit 10[$i$] increases the upper limit value of the drive current $I_{LED}[i]$. In this way, the upper limit value of the drive current $I_{LED}[i]$ can be increased in the mode $MD_{B2}$.

The drive reference voltage generation circuit 20B includes the current mirror circuit 230 that generates the output side current $I_{OUT\_B}$ proportional to the input side current $I_{IN\_B}$, and the resistor 200 that is an internal resistor. In the mode $MD_{B1}$, it supplies the output side current $I_{OUT\_B}$ to the resistor 200 so as to supply the voltage generated by the resistor 200 as the drive reference voltage $V_{DREF}$ to the driving circuit 10[$i$]. In the mode $MD_{B2}$, it supplies the output side current $I_{OUT\_B}$ as the current $I_{EX\_B}$ to the terminal $EX_{ISET}$ so as to supply the voltage at the terminal $EX_{ISET}$ as the drive reference voltage $V_{DREF}$ to the driving circuit 10[$i$]. The current mirror circuit 230 is an example of the current generation circuit, and the output side current $I_{OUT\_B}$ is an example of the predetermined current generated by the current generation circuit. In the present disclosure, the current generation circuit is not necessarily the current mirror circuit.

The drive reference voltage generation circuit 20B includes the switch 251 inserted in series between the output terminal 232 of the current mirror circuit 230 (the output terminal of the current generation circuit) and the resistor 200, and the switch 252 inserted in series between the output terminal 232 of the current mirror circuit 230 (the output terminal of the current generation circuit) and the terminal $EX_{ISET}$. The LED driver 1B further includes the switch control circuit (30B) that controls the switch 251 and the switch 252. In the mode $MD_{B1}$, the switch control circuit (30B) turns on the switch 251 and turns off the switch 252, so as to supply the output side current $I_{OUT\_B}$ to the resistor 200. In the mode $MD_{B2}$, it turns off the switch 251 and turns on the switch 252, so as to output the side current $I_{OUT\_B}$ as the current $I_{EX\_B}$ to the terminal $EX_{ISET}$.

In addition, the LED driver 1B further includes the abnormality detection circuit 40B that detects whether or not the drive reference voltage $V_{DREF}$ has an abnormality, on the basis of the voltage at the terminal $EX_{ISET}$ in the mode $MD_{B2}$. If the abnormality detection circuit 40B does not detect an abnormality in the mode $MD_{B2}$ (if the value of the external resistor abnormality flag is 0), the switch control circuit (30B) keeps turning off the switch 251 and turning on the switch 252. If the abnormality detection circuit 40B detects an abnormality in the mode $MD_{B2}$ (if the value of the external resistor abnormality flag is 1), it switches the switch 251 from off to on and switches the switch 252 from on to off, so as to transfer the operation mode of the circuit 20B from the mode $MD_{B2}$ to the mode $MD_{B1}$.

The structure of the third example can provide the same action and effect as the structure of the first example. In other words, to satisfy the request in the light emitting system SYS, the single LED driver 1B can function both as the LED driver having the upper limit value of the drive current $I_{LED}[i]$ that is the first upper limit value, and as the LED driver having the upper limit value of the drive current $I_{LED}[i]$ that is the second upper limit value higher than the first upper limit value. In other words, it is possible to provide the LED driver having high versatility in the upper limit of the drive current.

However, if the drive reference voltage $V_{DREF}$ becomes too small or too large in such a case where the terminal $EX_{ISET}$ is short-circuited or opened in the mode $MD_{B2}$, the upper limit value of the drive current $I_{LED}[i]$ becomes inappropriate. By disposing the abnormality detection circuit 40B, it is possible to prevent the light emitting unit LL[i] from being operated in such an inappropriate state.

Fourth Example

A fourth example is described. In the fourth example, a modified technique that can be applied to the third example is described. In the structure of FIG. 10, the voltage across the single the resistor 200 (the voltage drop by the single the resistor 200) is supplied as the drive reference voltage $V_{DREF}$ commonly to all the driving circuits 10[1] to 10[$n$] in the mode $MD_{B1}$, and the voltage across the single external resistor $R_{EX\_B}$ (the voltage drop by the single external resistor $R_{EX\_B}$) is supplied as the drive reference voltage $V_{DREF}$ commonly to all the driving circuits 10[1] to 10[$n$] in the mode $MD_{B2}$, but it may be possible to generate the drive reference voltage $V_{DREF}$ for each channel in the LED driver 1B.

Figure 12:
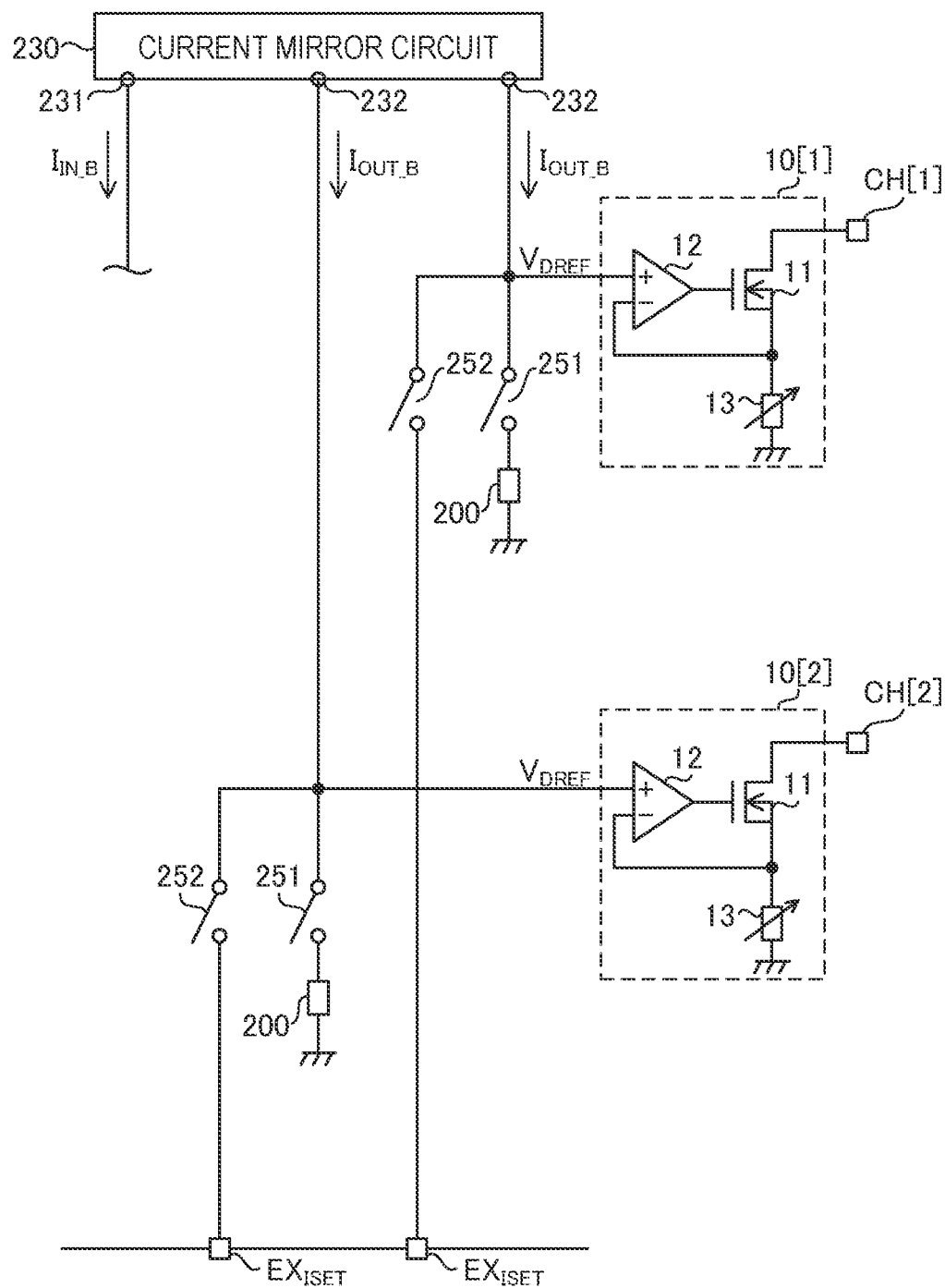
FIG. 12 is a modified internal structural diagram of a part of the LED driver, according to a fourth example of the embodiment of the present disclosure.
Figure 13:
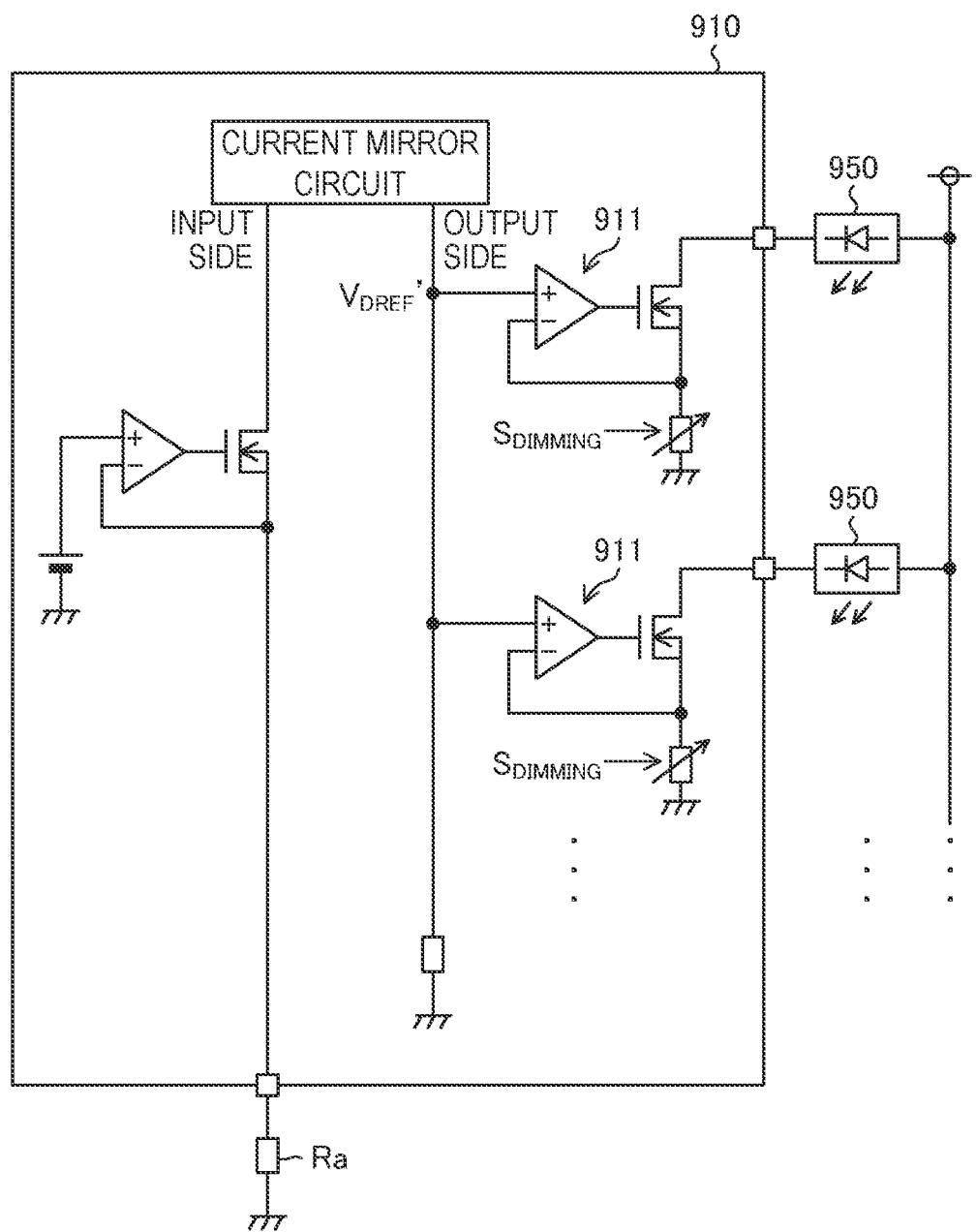
FIG. 13 is a diagram illustrating the LED driver and a plurality of light emitting units, according to a first reference structure.
Figure 14:
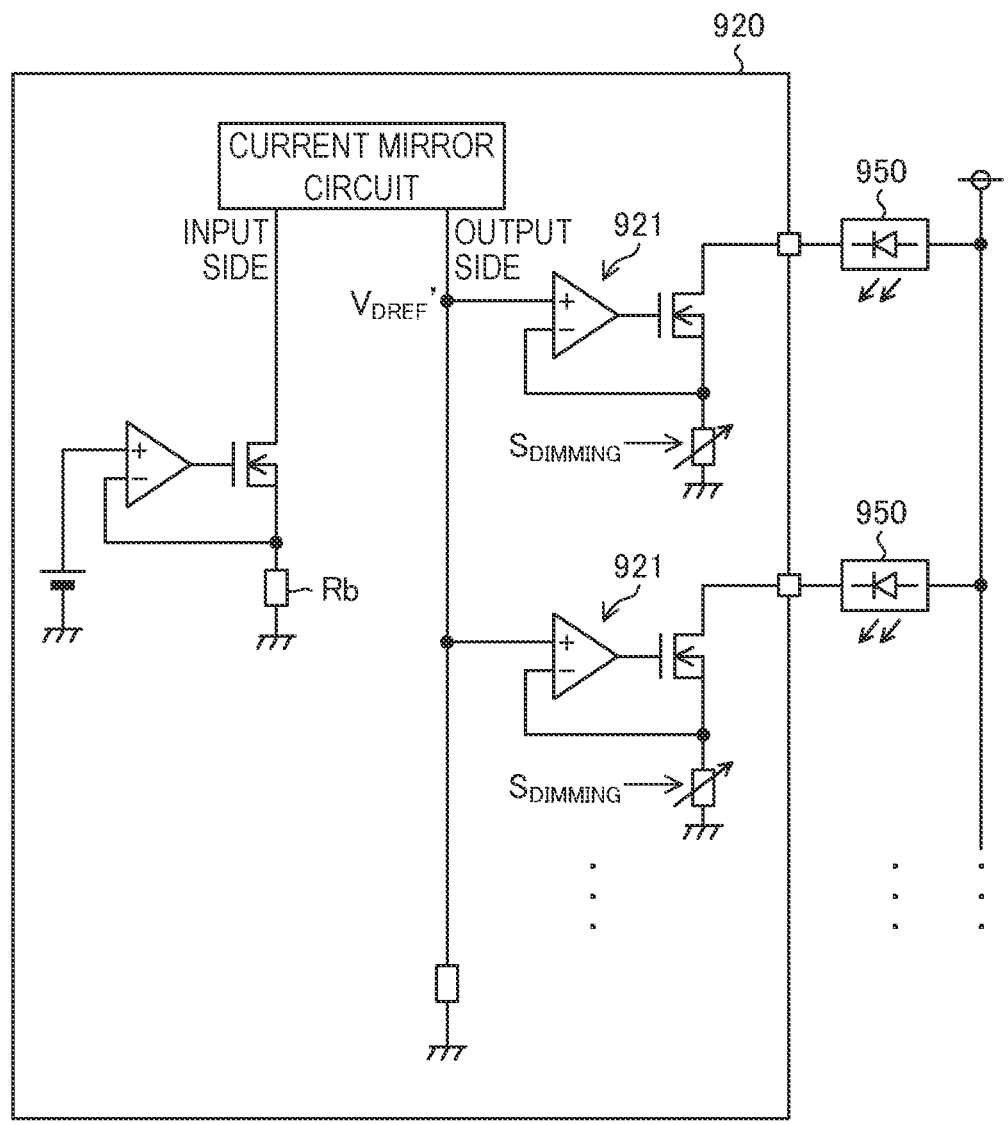
FIG. 14 is a diagram illustrating the LED driver and a plurality of light emitting units, according to a second reference structure.

Generation of the drive reference voltage $V_{DREF}$ for each channel in the LED driver 1B can be performed as follows. Specifically, as illustrated in FIG. 12, the current mirror circuit 230 is provided with total n, i.e. first to n-th channels of the output terminals 232, and the drive reference voltage generation circuit 20B is provided with total n sets of the resistors 200, the switches 251, the switches 252, and the terminals $EX_{ISET}$ (n=2 is supposed in FIG. 12). The i-th set of the resistor 200, the switch 251, the switch 252, and the terminal $EX_{ISET}$ are the resistor 200, the switch 251, the switch 252, and the terminal $EX_{ISET}$ for the i-th channel (i.e. for the driving circuit 10[$i$]).

Then, the first to n-th channels of the output terminals 232 are connected to one ends of the first to n-th channels of the resistors 200 through the first to n-th channels of the switches 251, respectively. The other ends of the first to n-th channels of the resistors 200 are all connected to the ground. The first to n-th channels of the resistors 200 have the same resistance value. In addition, the first to n-th channels of the output terminals 232 are connected to the first to n-th channels of the terminals $EX_{ISET}$ through the first to n-th channels of the switches 252, respectively.

When operating the circuit 20B in the mode $MD_{B1}$, the mode control circuit 30B turns on the first to n-th channels of the switches 251 and turns off the first to n-th channels of the switches 252. When operating the circuit 20B in the mode $MD_{B2}$, it turns off the first to n-th channels of the switches 251 and turns on the first to n-th channels of the switches 252. When the circuit 20B operates in the mode $MD_{B2}$, the first to n-th channels of the external resistors $R_{EX\_B}$ are connected between the ground and the first to n-th channels of the terminals $EX_{ISET}$, respectively, outside the LED driver 1B (the external resistor $R_{EX\_B}$ is not illustrated in FIG. 12).

In this way, in the mode $MD_{B1}$, the first to n-th channels of the resistors 200 generate the first to n-th channels of the drive reference voltages $V_{DREF}$, respectively. In the mode $MD_{B2}$, the voltages at the first to n-th channels of the terminals $EX_{ISET}$ (i.e. the voltages generated by the first to n-th channels of the external resistors $R_{EX\_B}$) are the first to n-th channels of the drive reference voltages $V_{DREF}$, respectively. The noninverting input terminals of the amplifiers 12 in the driving circuits 10[1] to 10[$n$] (i.e. the first to n-th channels of the driving circuits 10) are connected to the first to n-th channels of the output terminals 232, respectively. In this way, the noninverting input terminals of the amplifiers 12 in the driving circuits 10[1] to 10[$n$] are supplied with the first to n-th channels of the drive reference voltages $V_{DREF}$, respectively.

As illustrated in FIG. 12, when the set of the resistor 200, the switch 251, the switch 252, and the terminal $EX_{ISET}$ is disposed for each channel, mode setting can be made for each channel. In other words, for example, it may be possible to apply the mode $MD_{B1}$ to the first channel (i.e. the first channel of the switches 251 and 252 are turned on and turned off, respectively), and to apply the mode $MD_{B2}$ to the second channel (i.e. the second channel of the switches 251 and 252 are turned off and turned on, respectively).

Note that in the LED driver 1B, it may be possible to group the first to n-th channels into two or more blocks, and to generate the drive reference voltage $V_{DREF}$ for each block. Each block includes two or more channels.

Fifth Example

A fifth example is described. The light emitting system SYS may be mounted in a vehicle such as an automobile. In this case, any lighting device mounted in a vehicle can be constituted of the light emitting system SYS. The lighting device constituted of the light emitting system SYS can be any lighting device mounted in a vehicle, such as a headlamp, a tail lamp, a brake lamp (stop lamp), or a direction indicator of the vehicle.

For instance, when constituting a brake lamp of a vehicle using the light emitting system SYS, it is considered to use the mode $MD_{A2}$ or $MD_{B2}$ described in one of the first to fourth examples, in order to improve luminance of the brake lamp. In this case, suppose that an abnormality has occurred in a part of the terminal $EX_{ISET}$, and hence the high level detection result signal $S_{DET\_A}$ or $S_{DET\_B}$ is output from the abnormality detection circuit 40A or 40B. When the abnormality has occurred, to continue setting the drive reference voltage $V_{DREF}$ in the mode $MD_{A2}$ or $MD_{B2}$ is not appropriate. However, even if a part of the terminal $EX_{ISET}$ has an abnormality, to set the drive current $I_{LED}[i]$ to complete zero is not appropriate. If braking is performed, even if the original luminance is lowered, it is preferred that the light emitting system SYS turns on the brake lamp for safety.

Therefore, in the LED driver 1A according to the first or second example, when the high level detection result signal $S_{DET\_A}$ is derived in the mode $MD_{A2}$, the operation mode of the circuit 20A is changed from the mode $MD_{A2}$ to the mode $MD_{A1}$, so that supplying the drive current $I_{LED}[i]$ to the light emitting unit LL[$i$] can be continued. The same is true for the LED driver 1B according to the third or fourth example.

Sixth Example

A sixth example is described. In the LED driver 1A illustrated in FIG. 7 or the like, when the high level detection result signal $S_{DET\_A}$ is derived in the mode $MD_{A2}$, so that the value of the external resistor abnormality flag is set to 1, a shutdown process may be performed. Similarly, in the LED driver 1B illustrated in FIG. 10 or the like, when the high level detection result signal $S_{DET\_B}$ is derived in the mode $MD_{B2}$, so that the value of the external resistor abnormality flag is set to 1, the shutdown process may be performed. The shutdown process is realized by the driving circuits 10[1] to 10[$n$] under control by the control circuit 30. In the shutdown process, under control by the control circuit 30, the transistors 11 of the driving circuits 10[1] to 10[$n$] are all fixed to the OFF state regardless of the drive setting data (see FIG. 6), and hence the drive currents $I_{LED}[1]$ to $I_{LED}[n]$ are all maintained at zero.

It may be possible that the shutdown process can be enabled or disabled on the basis of a signal supplied from the MPU 2 to the LED driver 1A or 1B. For instance, the data holding unit 50 stores a shutdown setting value, and the shutdown setting value is set to 0 or 1 based on the signal supplied from the MPU 2 to the LED driver 1A or 1B. In the LED driver 1A or 1B, when the value of the external resistor abnormality flag is set to 1, the control circuit 30 refers to the value of the shutdown setting value. Then, if the shutdown setting value is 0, the control circuit 30 controls the circuit 20A or 20B to perform the operation described above in the first or third example, while if the shutdown setting value is 1, it performs the shutdown process.

Seventh Example

A seventh example is described. In the LED driver 1A illustrated in FIG. 7 or the like, when the high level detection result signal $S_{DET\_A}$ is derived in the mode $MD_{A2}$, the abnormality detection circuit 40 including the abnormality detection circuit 40A cooperates with the pull-up resistor $R_{PU}$ to set the level of the terminal FAILB, which is high level as a rule, to low level (see FIGS. 1 and 4). Similarly, in the LED driver 1B illustrated in FIG. 10 or the like, when the high level detection result signal $S_{DET\_B}$ is derived in the mode $MD_{B2}$, the abnormality detection circuit 40 including the abnormality detection circuit 40B cooperates with the pull-up resistor $R_{PU}$ to set the level of the terminal FAILB, which is high level as a rule, to low level (see FIG. 1, FIG. 4).

The MPU 2 can determine whether or not the LED driver 1 has an abnormality by monitoring the level of the wiring 3 that is equal to the level of the terminal FAILB. When recognizing that the level of the wiring 3 is low level, the MPU 2 can request the LED driver 1 (1A or 1B) to send data stored in the data holding unit 50 via the communication wiring 4. Here, the data requested to send includes the external resistor abnormality flag described above, a temperature abnormality flag indicating whether or not a temperature abnormality has occurred, an input voltage abnormality flag indicating whether or not an abnormality of the input voltage $V_{IN}$ has occurred, and the like. The MPU 2 can recognize which type of abnormality is detected in the LED driver 1, on the basis of the data received from the LED driver 1.

Eighth Example

An eighth example is described. In the above description, it is supposed that the operation mode of the drive reference voltage generation circuit 20 (20A or 20B) is set by the mode setting value, but the operation mode of the circuit 20 (20A or 20B) may be set based on the voltage at the external terminal for mode setting. In this case, the following structure can be adopted.

The external terminal for mode setting is included in the plurality of external terminals provided to the LED driver 1 (1A or 1B).

Further, the mode control circuit 30A illustrated in FIG. 7 sets the operation mode of the circuit 20A to the mode $MD_{A1}$ or $MD_{A2}$ in accordance with the voltage at the external terminal for mode setting. For instance, the voltage value at the external terminal for mode setting is binarized into low level or high level with respect to a predetermined threshold value. Then, if the voltage value of the external terminal for mode setting is low level, the operation mode of the circuit 20A is set to the mode $MD_{A1}$, while if the voltage value of the external terminal for mode setting is high level, the operation mode of the circuit 20A is set to the mode $MD_{A2}$ (or in the opposite way).

Similarly, the mode control circuit 30B illustrated in FIG. 10 sets the operation mode of the circuit 20B to the mode $MD_{B1}$ or $MD_{B2}$ in accordance with the voltage at the external terminal for mode setting. For instance, the voltage value at the external terminal for mode setting is binarized into low level or high level with respect to a predetermined threshold value. Then, if the voltage value of the external terminal for mode setting is low level, the operation mode of the circuit 20B is set to the mode $MD_{B1}$, while if the voltage value of the external terminal for mode setting is high level, the operation mode of the circuit 20B is set to the mode $MD_{B2}$ (or in the opposite way).

However, when the high level detection result signal $S_{DET\_A}$ or $S_{DET\_B}$ is derived and the value of the external resistor abnormality flag is set to 1 in the mode $MD_{A2}$ or $MD_{B2}$, the process as described above in one of the examples may be performed.

Ninth Example

A ninth example is described.

As described above, the number of channels, i.e. the value of n in the LED driver 1 may be 1. If n is 1, [i] indicating the channel number in the above description is [1].

The light emitting unit LL is constituted of one or more light emitting elements that emit light when current is supplied. The LED as a light emitting element may be any type of light emitting diode, or may be an organic LED that realizes an organic electro-luminescence (EL). In addition, the light emitting element may be one that is not classified into LED, such as a laser diode, for example.

The light emitting element drive device embodied as the LED driver and the light emitting system SYS in this embodiment can be used not only in the in-vehicle application but also in various applications such as a backlight for a liquid crystal display panel, a laser imaging detection and ranging (LIDAR) system using a laser diode, or a head up display.

For any signal or voltage, a relationship between high level and low level may be inverted in a form that does not spoil the spirit of the above description.

The channel types of the field effect transistors (FETs) in the embodiments described above are merely examples, and the circuit configuration including FETs can be modified, in such a manner that an N-channel type FET is replaced with a P-channel type FET, or that a P-channel type FET is replaced with an N-channel type FET.

As long as no inconvenience occurs, any transistor in the above description may be any type of transistor. For instance, any MOSFET as a transistor in the above description can be replaced with a junction-type FET, an insulated gate bipolar transistor (IGBT), or a bipolar transistor, as long as no inconvenience occurs. Any transistor has a first electrode, a second electrode, and a control electrode. In an FET, one of the first and second electrodes is a drain, the other electrode is a source, and the control electrode is a gate. In an IGBT, one of the first and second electrodes is a collector, the other electrode is an emitter, and the control electrode is a gate. In a bipolar transistor that is not an IGBT, one of the first and second electrodes is a collector, the other electrode is an emitter, and the control electrode is a base.

The embodiment of the present disclosure can be appropriately and variously modified within the scope of the technical concept recited in the claims. The embodiments described above are merely examples of the embodiment of the present disclosure, and meanings of terms of the present disclosure or the components thereof are not limited to those described in the above embodiments. Specific numeric values in the above description are merely examples, and as a matter of course, they can be changed to various values.

The invention claimed is:

1. A light emitting element drive device comprising:
a driving circuit configured to supply a variable drive current to a light emitting unit including one or more light emitting elements, so that the light emitting unit is configured to emit light;
a drive reference voltage generation circuit configured to generate a drive reference voltage defining an upper limit value of the drive current, and supply the drive reference voltage to the driving circuit; and
a specific external terminal, wherein an external resistor is connectable between the specific external terminal and ground, outside the light emitting element drive device, and wherein:
the drive reference voltage generation circuit is operable selectively in a first mode to generate the drive reference voltage regardless of the state of the specific external terminal, or a second mode to generate the drive reference voltage in accordance with a second mode current through the specific external terminal, and the light emitting element drive device is configured such that when the drive reference voltage generation circuit operates in the second mode in a state where the external resistor is connected between the specific external terminal and ground, the drive reference voltage generation circuit supplies the second mode current to the external resistor through the specific external terminal, so as to generate the drive reference voltage in accordance with a magnitude of the second mode current or the voltage generated by the external resistor.

2. The light emitting element drive device according to claim 1, wherein
when the drive reference voltage generation circuit operates in the second mode in the state where the external resistor is connected between the specific external terminal and the ground, the drive reference voltage is higher than that in the first mode, depending on the resistance value of the external resistor, and
the driving circuit increases the upper limit value of the drive current along with increase in the drive reference voltage.

3. The light emitting element drive device according to claim 1, wherein
the drive reference voltage generation circuit includes a reference current generation circuit configured to generate a reference current commonly in the first mode and in the second mode, a current superimposing circuit configured to generate the second mode current only in the second mode out of the first and second modes, and a current mirror circuit configured to generate an output side current proportional to an input side current, so as to generate the drive reference voltage in proportion to the output side current, and
in the first mode the input side current is equal to the reference current, and in the second mode the input side current is equal to the reference current plus the second mode current.

4. The light emitting element drive device according to claim 3, wherein
the drive reference voltage generation circuit includes a switch inserted in series between an input terminal of the current mirror circuit and the specific external terminal,
the light emitting element drive device further includes a switch control circuit configured to control the switch, and
in the first mode the switch control circuit turns off the switch, while in the second mode it turns on the switch so as to superimpose the second mode current flowing through the specific external terminal on the input side current.

5. The light emitting element drive device according to claim 4, further comprising an abnormality detection circuit configured to detect whether or not the second mode current has an abnormality, on the basis of a magnitude of the second mode current flowing through the specific external terminal in the second mode, wherein
if the abnormality detection circuit does not detect an abnormality in the second mode, the switch control circuit keeps turning on the switch, and if the abnormality detection circuit detects an abnormality in the second mode, the switch control circuit switches the switch from on to off, so that operation mode of the drive reference voltage generation circuit is changed from the second mode to the first mode.

6. The light emitting element drive device according to claim 1, wherein the drive reference voltage generation circuit includes a current generation circuit configured to generate a predetermined current, and an internal resistor,
in the first mode the drive reference voltage generation circuit supplies the predetermined current to the internal resistor, so as to supply a voltage generated by the internal resistor as the drive reference voltage to the driving circuit, and
in the second mode the drive reference voltage generation circuit supplies the predetermined current as the second mode current to the specific external terminal, so as to supply a voltage generated at the specific external terminal as the drive reference voltage to the driving circuit.

7. The light emitting element drive device according to claim 6, wherein
the drive reference voltage generation circuit includes a first switch inserted in series between an output terminal of the current generation circuit and the internal resistor, and a second switch inserted in series between the output terminal of the current generation circuit and the specific external terminal,
the light emitting element drive device further includes a switch control circuit configured to control the first switch and the second switch, and
in the first mode the switch control circuit turns on the first switch and turns off the second switch, so that the predetermined current is supplied to the internal resistor, while in the second mode the switch control circuit turns off the first switch and turns on the second switch, so that the predetermined current is supplied as the second mode current to the specific external terminal.

8. The light emitting element drive device according to claim 7, further comprising an abnormality detection circuit configured to detect whether or not the drive reference voltage has an abnormality, on the basis of a voltage at the specific external terminal in the second mode, wherein the light emitting element drive device is configured such that if the abnormality detection circuit does not detect an abnormality in the second mode, the switch control circuit keeps turning off the first switch and keeps turning on the second switch, and if the abnormality detection circuit detects an abnormality in the second mode, the switch control circuit switches the first switch from off to on and switches the second switch from on to off, so that operation mode of the drive reference voltage generation circuit is changed from the second mode to the first mode.

9. The light emitting element drive device according to claim 1, wherein
the driving circuit is disposed for each of a plurality of channels, and
the drive reference voltage generation circuit is configured to generate the drive reference voltage for each channel.

10. A light emitting system comprising:
the light emitting element drive device according to claim 1; and
the light emitting unit to be driven and controlled by the light emitting element drive device.

11. A light emitting element drive device comprising:
a driving circuit configured to supply a variable drive current to a light emitting unit including one or more light emitting elements, so that the light emitting unit is configured to emit light;
a drive reference voltage generation circuit configured to generate a drive reference voltage defining an upper limit value of the drive current, and supply the drive reference voltage to the driving circuit; and
a specific external terminal,
wherein:
the drive reference voltage generation circuit is operable selectively in a first mode to generate the drive reference voltage regardless of the state of the specific external terminal, or a second mode to generate the drive reference voltage in accordance with a second mode current through the specific external terminal,
the drive reference voltage generation circuit includes a reference current generation circuit configured to generate a reference current commonly in the first mode and in the second mode, a current superimposing circuit configured to generate the second mode current only in the second mode out of the first and second modes, and a current mirror circuit configured to generate an output side current proportional to an input side current, so as to generate the drive reference voltage in proportion to the output side current, and
in the first mode the input side current is equal to the reference current, and in the second mode the input side current is equal to the reference current plus the second mode current.

12. The light emitting element drive device according to claim 11, wherein
the drive reference voltage generation circuit includes a switch inserted in series between an input terminal of the current mirror circuit and the specific external terminal,
the light emitting element drive device further includes a switch control circuit configured to control the switch, and
in the first mode the switch control circuit turns off the switch, while in the second mode it turns on the switch so as to superimpose the second mode current flowing through the specific external terminal on the input side current.

13. The light emitting element drive device according to claim 12 further comprising an abnormality detection circuit configured to detect whether or not the second mode current has an abnormality, on the basis of a magnitude of the second mode current flowing through the specific external terminal in the second mode, wherein the light emitting element drive device is configured such that if the abnormality detection circuit does not detect an abnormality in the second mode, the switch control circuit keeps turning on the switch, and if the abnormality detection circuit detects an abnormality in the second mode, the switch control circuit switches the switch from on to off, so that operation mode of the drive reference voltage generation circuit is changed from the second mode to the first mode.

14. The light emitting element drive device according to claim 11, wherein
the driving circuit is disposed for each of a plurality of channels, and
the drive reference voltage generation circuit is configured to generate the drive reference voltage for each channel.

15. A light emitting system comprising:
the light emitting element drive according to claim 11; and
the light emitting unit to be driven and controlled by the light emitting element drive device.

16. A light emitting element drive device comprising:
a driving circuit configured to supply a variable drive current to a light emitting unit including one or more light emitting elements, so that the light emitting unit is configured to emit light;
a drive reference voltage generation circuit configured to generate a drive reference voltage defining an upper limit value of the drive current, and supply the drive reference voltage to the driving circuit; and
a specific external terminal,
wherein:
the drive reference voltage generation circuit is operable selectively in a first mode to generate the drive reference voltage regardless of the state of the specific external terminal, or a second mode to generate the drive reference voltage in accordance with a second mode current through the specific external terminal,
the drive reference voltage generation circuit includes a current generation circuit configured to generate a predetermined current, and an internal resistor,
in the first mode the drive reference voltage generation circuit supplies the predetermined current to the internal resistor, so as to supply a voltage generated by the internal resistor as the drive reference voltage to the driving circuit, and
in the second mode the drive reference voltage generation circuit supplies the predetermined current as the second mode current to the specific external terminal, so as to supply a voltage generated at the specific external terminal as the drive reference voltage to the driving circuit.

17. The light emitting element drive device according to claim 16, wherein
the drive reference voltage generation circuit includes a first switch inserted in series between an output terminal of the current generation circuit and the internal resistor, and a second switch inserted in series between the output terminal of the current generation circuit and the specific external terminal,
the light emitting element drive device further includes a switch control circuit configured to control the first switch and the second switch, and
in the first mode the switch control circuit turns on the first switch and turns off the second switch, so that the predetermined current is supplied to the internal resistor, while in the second mode the switch control circuit turns off the first switch and turns on the second switch, so that the predetermined current is supplied as the second mode current to the specific external terminal.

18. The light emitting element drive device according to claim 17 further comprising an abnormality detection circuit configured to detect whether or not the drive reference voltage has an abnormality, on the basis of a voltage at the specific external terminal in the second mode, wherein the light emitting element drive device is configured such that if the abnormality detection circuit does not detect an abnormality in the second mode, the switch control circuit keeps turning off the first switch and keeps turning on the second switch, and if the abnormality detection circuit detects an abnormality in the second mode, the switch control circuit switches the first switch from off to on and switches the second switch from on to off, so that operation mode of the drive reference voltage generation circuit is changed from the second mode to the first mode.

19. The light emitting element drive device according to claim 16, wherein the driving circuit is disposed for each of a plurality of channels, and the drive reference voltage generation circuit is configured to generate the drive reference voltage for each channel.

20. A light emitting system comprising:

the light emitting element drive device according to claim 16; and the light emitting unit to be driven and controlled by the light emitting element drive device.

* * * * *